(12) United States Patent
Liu et al.

(10) Patent No.: US 10,944,656 B2
(45) Date of Patent: Mar. 9, 2021

(54) TECHNOLOGIES FOR ADAPTIVE PROCESSING OF MULTIPLE BUFFERS

(71) Applicant: INTEL CORPORATION, Santa Clara, CA (US)

(72) Inventors: Xiaodong Liu, Shanghai (CN); Qihua Dai, Shanghai (CN); Weigang Li, Shanghai (CN); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 16/311,231

(22) PCT Filed: Dec. 31, 2016

(86) PCT No.: PCT/CN2016/114023
§ 371 (c)(1),
(2) Date: Dec. 19, 2018

(87) PCT Pub. No.: WO2018/014515
PCT Pub. Date: Jan. 25, 2018

(65) Prior Publication Data
US 2019/0196824 A1 Jun. 27, 2019

Related U.S. Application Data

(60) Provisional application No. 62/365,969, filed on Jul. 22, 2016, provisional application No. 62/376,859, (Continued)

(51) Int. Cl.
*G06F 9/30* (2018.01)
*H04L 12/26* (2006.01)
(Continued)

(52) U.S. Cl.
CPC ............ *H04L 43/08* (2013.01); *G02B 6/3882* (2013.01); *G02B 6/3893* (2013.01);
(Continued)

(58) Field of Classification Search
None
See application file for complete search history.

(56) References Cited

U.S. PATENT DOCUMENTS

| | | | |
|---|---|---|---|
| 5,717,892 A | 2/1998 | Oldfield | |
| 10,055,228 B2 * | 8/2018 | Lin | ........................ G06F 9/3838 |

(Continued)

FOREIGN PATENT DOCUMENTS

| | | |
|---|---|---|
| WO | 2005/096141 | 10/2005 |
| WO | 2015/183467 | 12/2015 |
| WO | WO2015/183467 | 12/2015 |

OTHER PUBLICATIONS

PCT Search Report and Written Opinion prepared for PCT/CN2016/114023, completed Apr. 13, 2017.
(Continued)

*Primary Examiner* — Cheng Yuan Tseng
(74) *Attorney, Agent, or Firm* — Compass IP Law, PC

(57) ABSTRACT

Technologies for adaptive processing of multiple buffers is disclosed. A compute device may establish a buffer queue to which applications can submit buffers to be processed, such as by hashing the submitted buffers. The compute device monitors the buffer queue and determines an efficient way of processing the buffer queue based on the number of buffers present. The compute device may process the buffers serially with a single processor core of the compute device or may process the buffers in parallel with single-instruction, multiple data (SIMD) instructions. The compute device may determine which method to use based on a comparison of the throughput of serially processing the buffers as compared to (Continued)

parallel processing the buffers, which may depend on the number of buffers in the buffer queue.

25 Claims, 15 Drawing Sheets

Related U.S. Application Data filed on Aug. 18, 2016, provisional application No. 62/427,268, filed on Nov. 29, 2016.

(51) Int. Cl.

| | |
|---|---|
| *G06F 16/901* | (2019.01) |
| *H04B 10/25* | (2013.01) |
| *G02B 6/38* | (2006.01) |
| *G02B 6/42* | (2006.01) |
| *G02B 6/44* | (2006.01) |
| *G06F 1/18* | (2006.01) |
| *G06F 1/20* | (2006.01) |
| *G06F 3/06* | (2006.01) |
| *G06F 8/65* | (2018.01) |
| *G06F 9/4401* | (2018.01) |
| *G06F 9/54* | (2006.01) |
| *G06F 12/109* | (2016.01) |
| *G06F 12/14* | (2006.01) |
| *G06F 13/16* | (2006.01) |
| *G06F 13/40* | (2006.01) |
| *G08C 17/02* | (2006.01) |
| *G11C 5/02* | (2006.01) |
| *G11C 7/10* | (2006.01) |
| *G11C 11/56* | (2006.01) |
| *G11C 14/00* | (2006.01) |
| *H03M 7/30* | (2006.01) |
| *H03M 7/40* | (2006.01) |
| *H04L 12/24* | (2006.01) |
| *H04L 12/931* | (2013.01) |
| *H04L 12/947* | (2013.01) |
| *H04L 29/08* | (2006.01) |
| *H04L 29/06* | (2006.01) |
| *H04Q 11/00* | (2006.01) |
| *H05K 7/14* | (2006.01) |
| *G06F 9/38* | (2018.01) |
| *G06F 9/50* | (2006.01) |
| *H04L 12/851* | (2013.01) |
| *H04L 12/811* | (2013.01) |
| *H05K 5/02* | (2006.01) |
| *H04W 4/80* | (2018.01) |
| *G06Q 10/08* | (2012.01) |
| *G06Q 10/00* | (2012.01) |
| *G06Q 50/04* | (2012.01) |
| *H04L 12/911* | (2013.01) |
| *B25J 15/00* | (2006.01) |
| *B65G 1/04* | (2006.01) |
| *H05K 7/20* | (2006.01) |
| *H04L 12/939* | (2013.01) |
| *H04W 4/02* | (2018.01) |
| *H04L 12/751* | (2013.01) |
| *G06F 13/42* | (2006.01) |
| *H05K 1/18* | (2006.01) |
| *G05D 23/19* | (2006.01) |
| *G05D 23/20* | (2006.01) |
| *H04L 12/927* | (2013.01) |
| *H05K 1/02* | (2006.01) |
| *H04L 12/781* | (2013.01) |
| *H04Q 1/04* | (2006.01) |
| *G06F 12/0893* | (2016.01) |
| *H05K 13/04* | (2006.01) |
| *G11C 5/06* | (2006.01) |
| *G06F 11/14* | (2006.01) |
| *G06F 11/34* | (2006.01) |
| *G06F 12/0862* | (2016.01) |
| *G06F 15/80* | (2006.01) |
| *H04L 12/919* | (2013.01) |
| *G06F 12/10* | (2016.01) |
| *G06Q 10/06* | (2012.01) |
| *G07C 5/00* | (2006.01) |
| *H04L 12/28* | (2006.01) |
| *H04L 29/12* | (2006.01) |
| *H04L 9/06* | (2006.01) |
| *H04L 9/14* | (2006.01) |
| *H04L 9/32* | (2006.01) |
| *H04L 12/933* | (2013.01) |

(52) U.S. Cl.
CPC ......... *G02B 6/3897* (2013.01); *G02B 6/4292* (2013.01); *G02B 6/4452* (2013.01); *G06F 1/183* (2013.01); *G06F 1/20* (2013.01); *G06F 3/064* (2013.01); *G06F 3/0613* (2013.01); *G06F 3/0625* (2013.01); *G06F 3/0653* (2013.01); *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01); *G06F 9/544* (2013.01); *G06F 12/109* (2013.01); *G06F 12/1408* (2013.01); *G06F 13/1668* (2013.01); *G06F 13/409* (2013.01); *G06F 13/4068* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01); *H03M 7/3086* (2013.01); *H03M 7/4056* (2013.01); *H03M 7/4081* (2013.01); *H04B 10/25891* (2020.05); *H04L 41/145* (2013.01); *H04L 43/0817* (2013.01); *H04L 43/0876* (2013.01); *H04L 43/0894* (2013.01); *H04L 49/00* (2013.01); *H04L 49/25* (2013.01); *H04L 49/357* (2013.01); *H04L 49/45* (2013.01); *H04L 67/02* (2013.01); *H04L 67/306* (2013.01); *H04L 69/04* (2013.01); *H04L 69/329* (2013.01); *H04Q 11/0003* (2013.01); *H05K 7/1442* (2013.01); *B25J 15/0014* (2013.01); *B65G 1/0492* (2013.01); *G05D 23/1921* (2013.01); *G05D 23/2039* (2013.01); *G06F 3/061* (2013.01); *G06F 3/067* (2013.01); *G06F 3/0611* (2013.01); *G06F 3/0616* (2013.01); *G06F 3/0619* (2013.01); *G06F 3/0631* (2013.01); *G06F 3/0638* (2013.01); *G06F 3/0647* (2013.01); *G06F 3/0658* (2013.01); *G06F 3/0659* (2013.01); *G06F 9/3887* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 13/161* (2013.01); *G06F 13/1694* (2013.01); *G06F 13/4022* (2013.01); *G06F 13/42* (2013.01); *G06F*

13/4282 (2013.01); G06F 15/8061 (2013.01); G06F 2209/5019 (2013.01); G06F 2209/5022 (2013.01); G06F 2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/06 (2013.01); G06Q 10/06314 (2013.01); G06Q 10/087 (2013.01); G06Q 10/20 (2013.01); G06Q 50/04 (2013.01); G07C 5/008 (2013.01); G08C 2200/00 (2013.01); G11C 5/06 (2013.01); H03M 7/30 (2013.01); H03M 7/3084 (2013.01); H03M 7/40 (2013.01); H03M 7/4031 (2013.01); H03M 7/6005 (2013.01); H03M 7/6023 (2013.01); H04B 10/25 (2013.01); H04L 9/0643 (2013.01); H04L 9/14 (2013.01); H04L 9/3247 (2013.01); H04L 9/3263 (2013.01); H04L 12/2809 (2013.01); H04L 29/12009 (2013.01); H04L 41/024 (2013.01); H04L 41/046 (2013.01); H04L 41/082 (2013.01); H04L 41/0813 (2013.01); H04L 41/0896 (2013.01); H04L 41/12 (2013.01); H04L 41/147 (2013.01); H04L 41/5019 (2013.01); H04L 43/065 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/15 (2013.01); H04L 49/555 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/34 (2013.01); H04Q 1/04 (2013.01); H04Q 11/00 (2013.01); H04Q 11/0005 (2013.01); H04Q 11/0062 (2013.01); H04Q 11/0071 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/023 (2013.01); H04W 4/80 (2018.02); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1447 (2013.01); H05K 7/1461 (2013.01); H05K 7/1485 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); H05K 2201/066 (2013.01); H05K 2201/10121 (2013.01); H05K 2201/10159 (2013.01); H05K 2201/10189 (2013.01); Y02D 10/00 (2018.01); Y02P 90/30 (2015.11); Y04S 10/50 (2013.01); Y04S 10/52 (2013.01); Y10S 901/01 (2013.01)

(56) References Cited

U.S. PATENT DOCUMENTS

| | | | |
|---|---|---|---|
| 2011/0145553 | A1 | 6/2011 | Levanoni et al. |
| 2014/0189704 | A1 | 7/2014 | Narvaez et al. |
| 2015/0317157 | A1 | 11/2015 | Gruber et al. |

OTHER PUBLICATIONS

Extended European search report for European patent application No. 16909442.2, dated Jan. 2, 2020 (10 pages).

* cited by examiner

TECHNOLOGIES FOR ADAPTIVE PROCESSING OF MULTIPLE BUFFERS

CROSS-REFERENCE TO RELATED APPLICATIONS

The present application is a national stage entry under 35 USC § 371(b) of International Application No. PCT/US2016/114023, filed Dec. 31, 2016, which claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

A common computing task is processing a buffer of data, such as by hashing the buffer, encrypting the buffer, or compressing the buffer. In some cases, a compute device may need to process several buffers with the same algorithm. In such cases, single instruction, multiple data (SIMD) instructions may be used to process several buffers in parallel in a single processor core of a compute device. For example, a single processor core may be able to perform a hash algorithm on 8 buffers in parallel using SIMD instructions.

One challenge in processing multiple buffers is determining when to process a single buffer as compared to processing multiple buffers. For example, a compute device may receive a single buffer to be processed and begin processing that buffer. However, an additional buffer to be processed may be received shortly after the compute device begins to process the single, first buffer. Similarly, a compute device may receive a single buffer to be processed, and may wait a relatively long time before beginning the processing in case the compute device receives an additional buffer.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
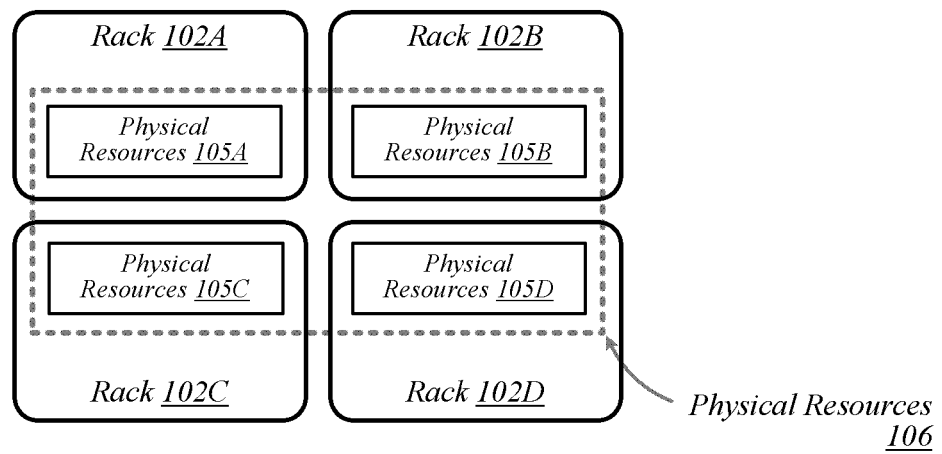
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as Dual In-line Memory Modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, Application Specific Integrated Circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
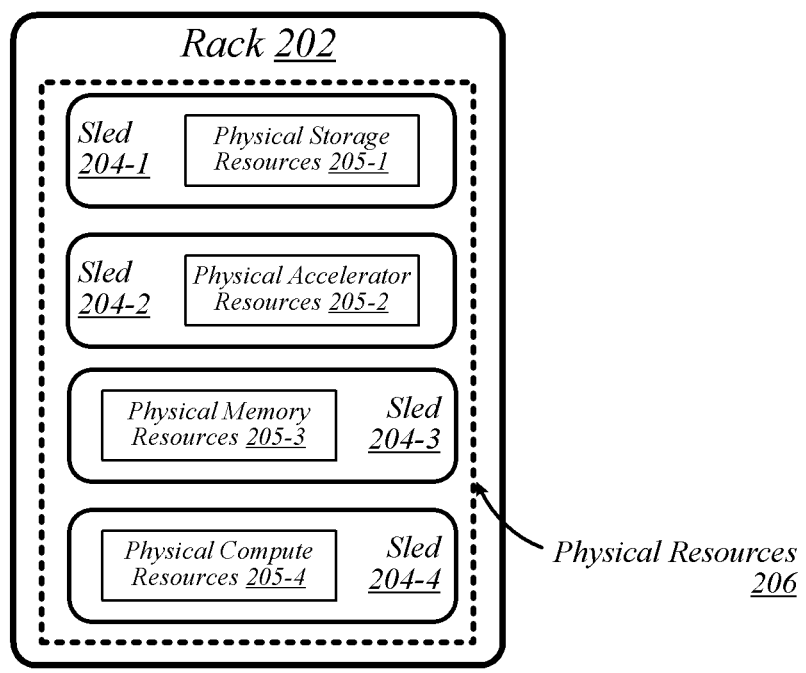
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
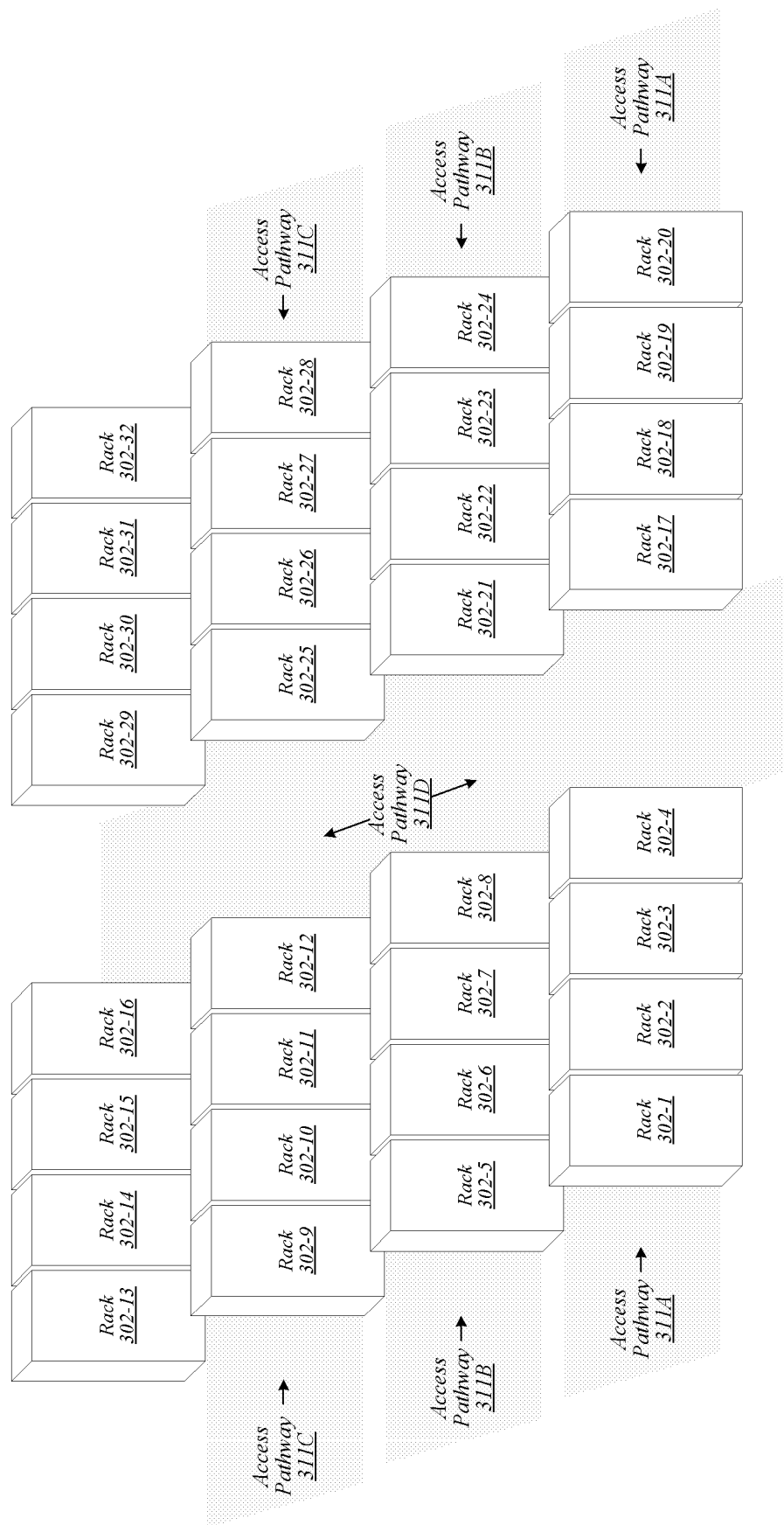
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
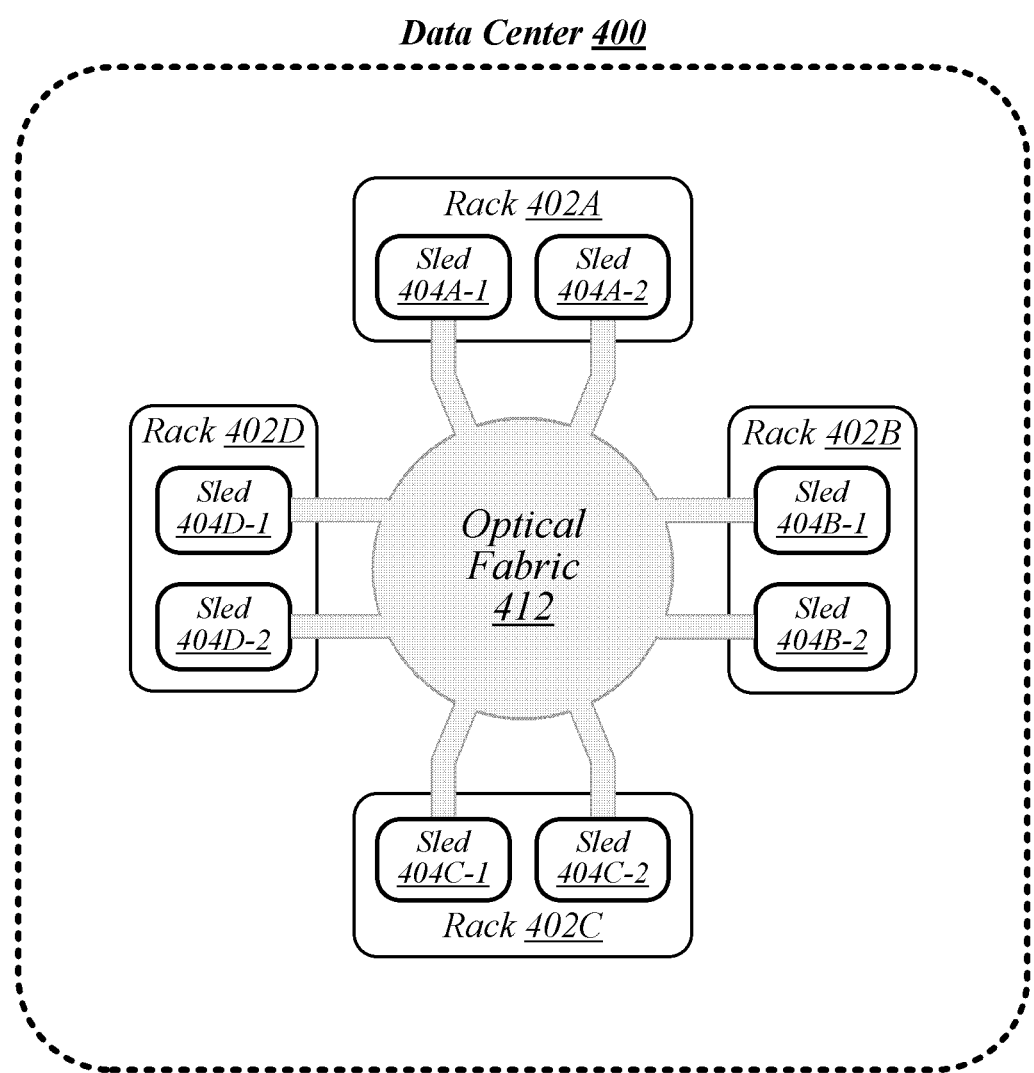
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
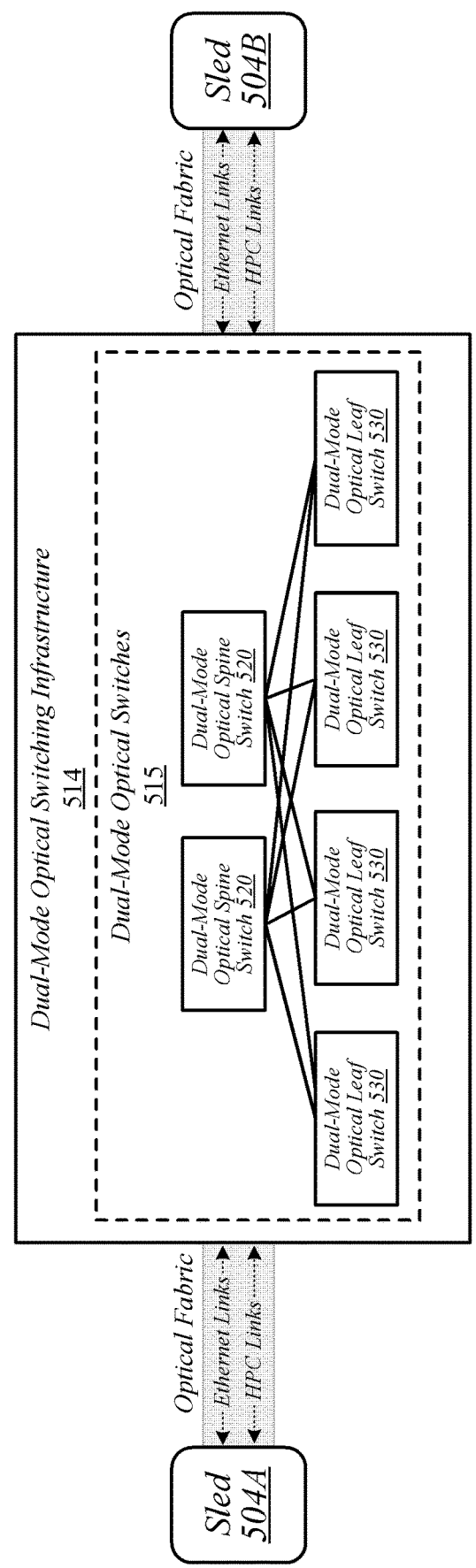
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
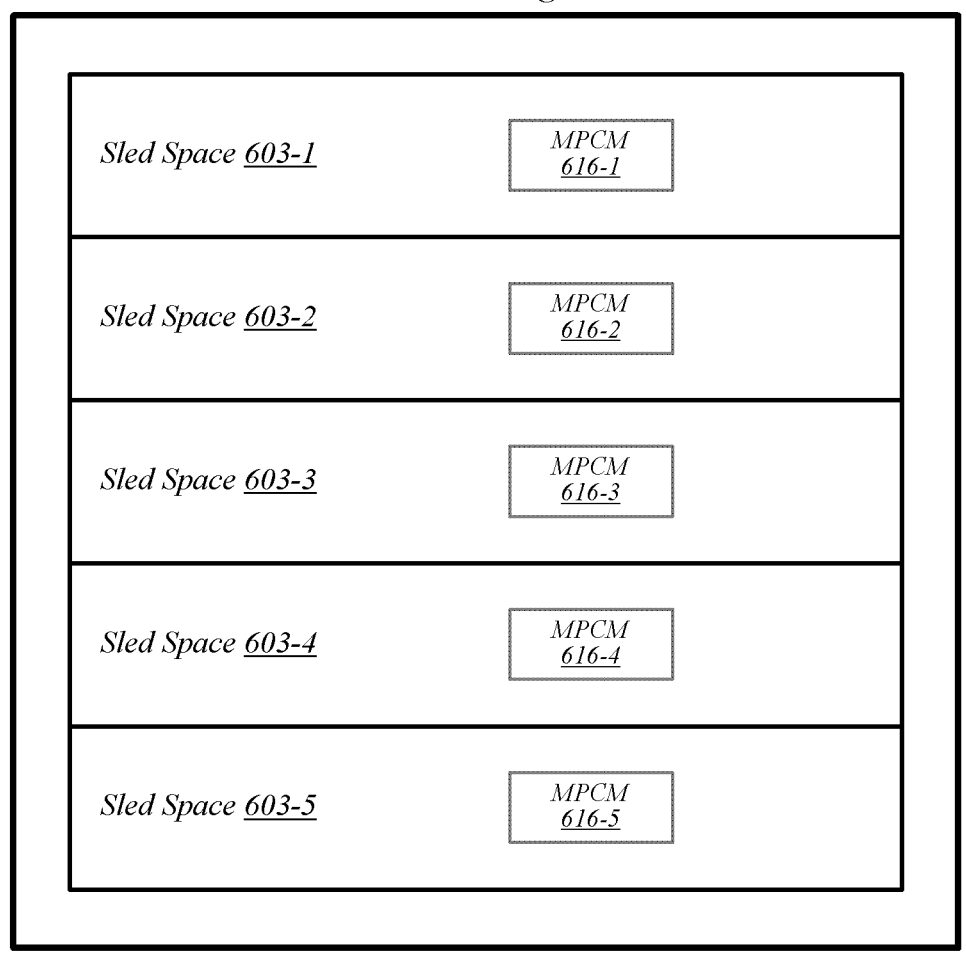
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
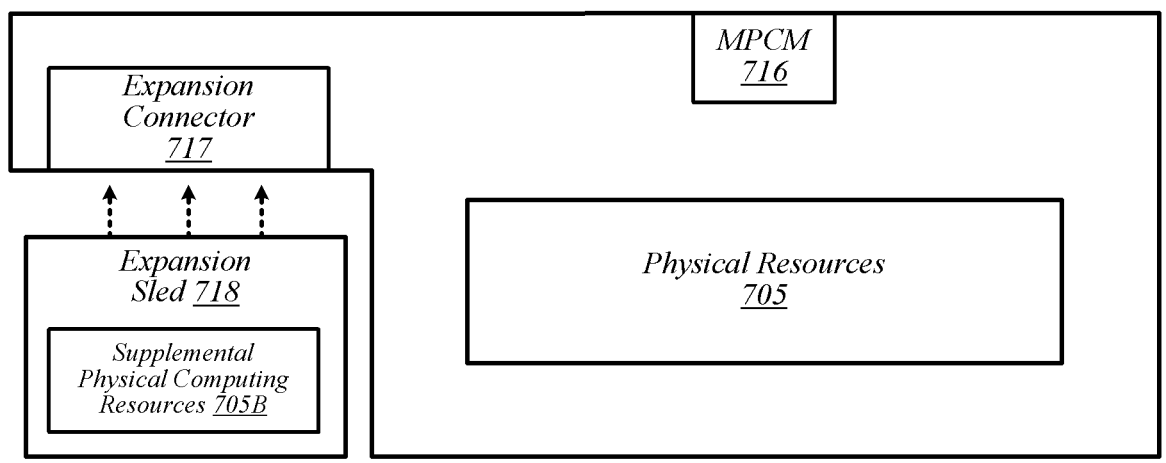
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
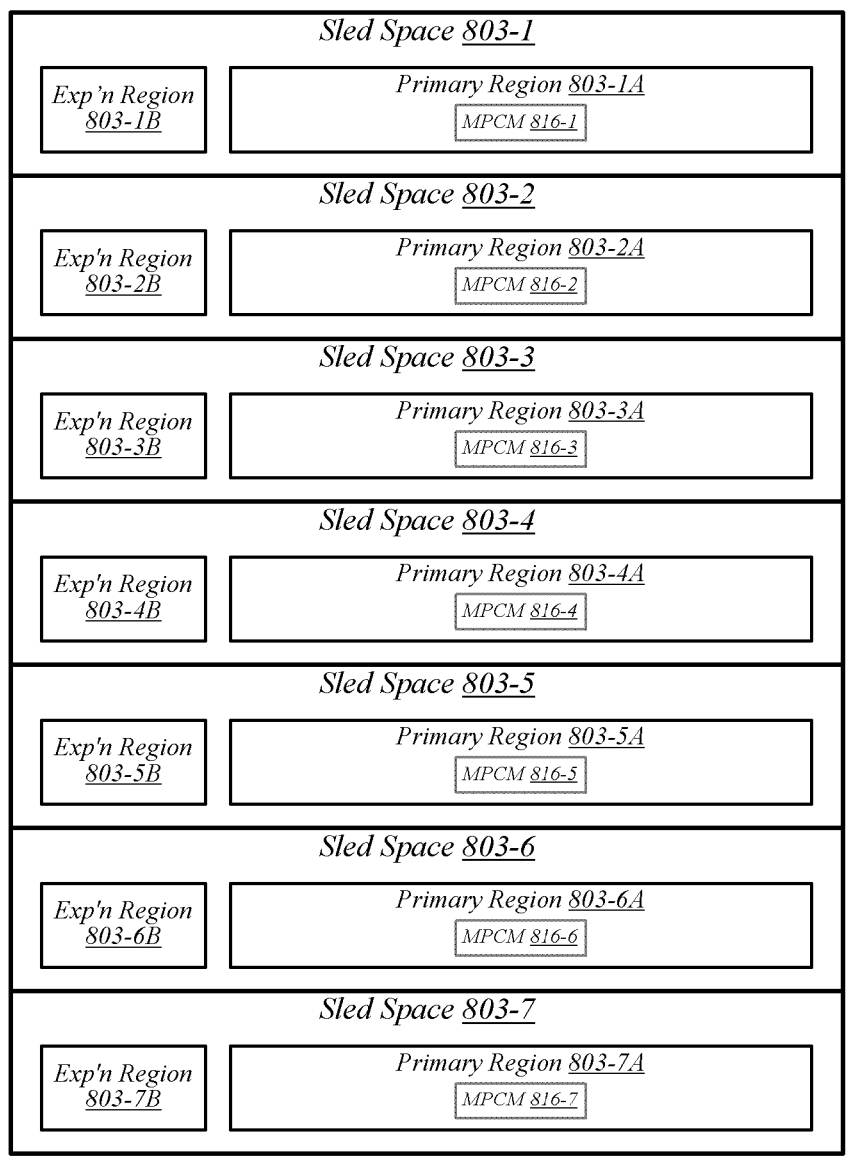
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
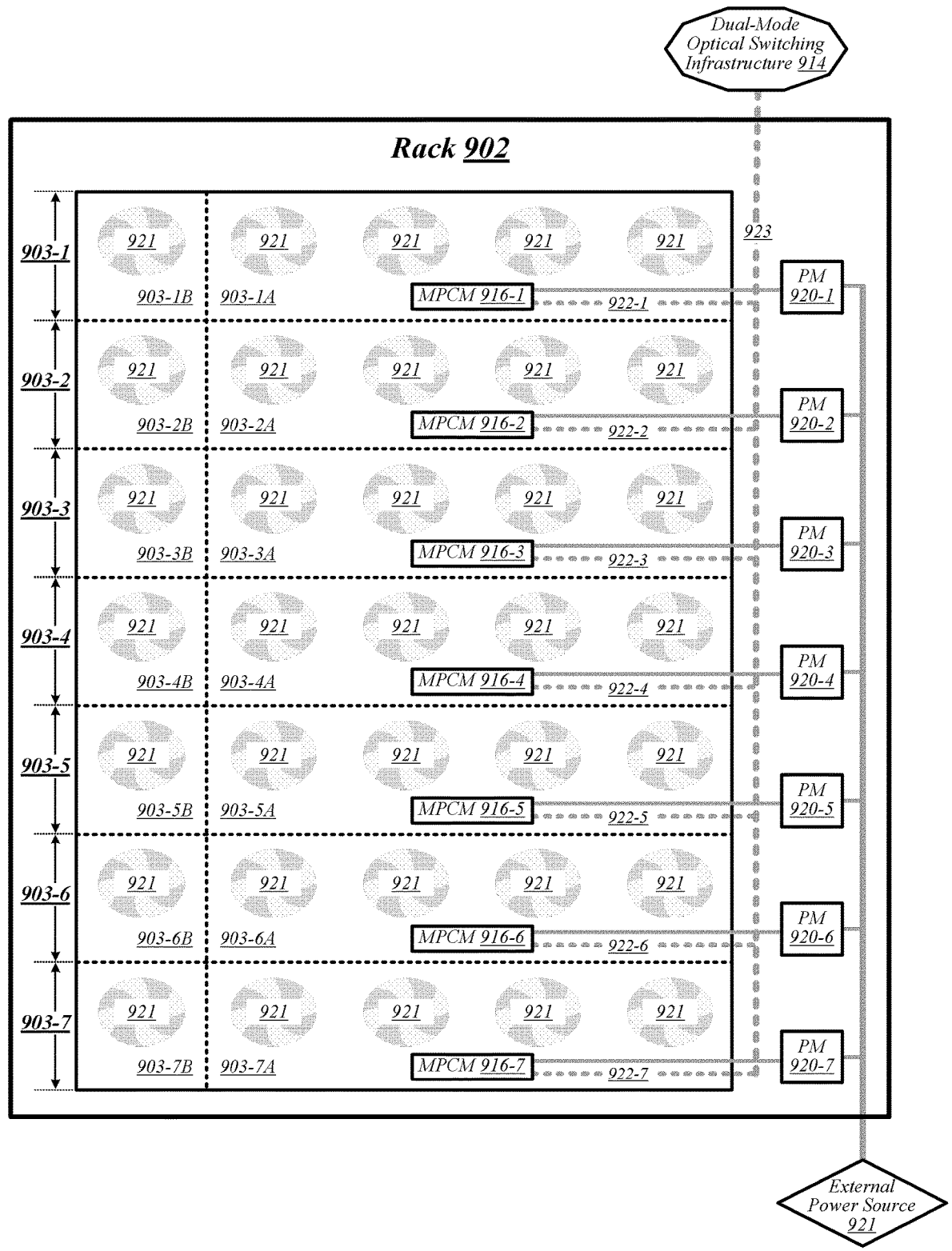
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
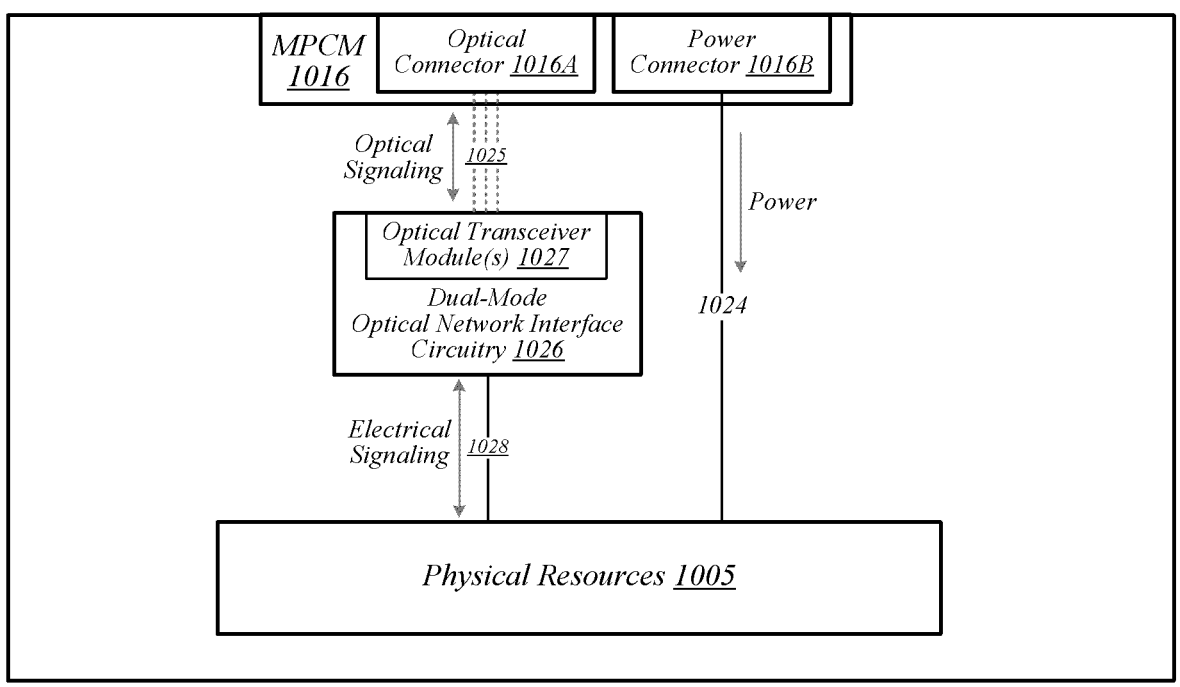
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
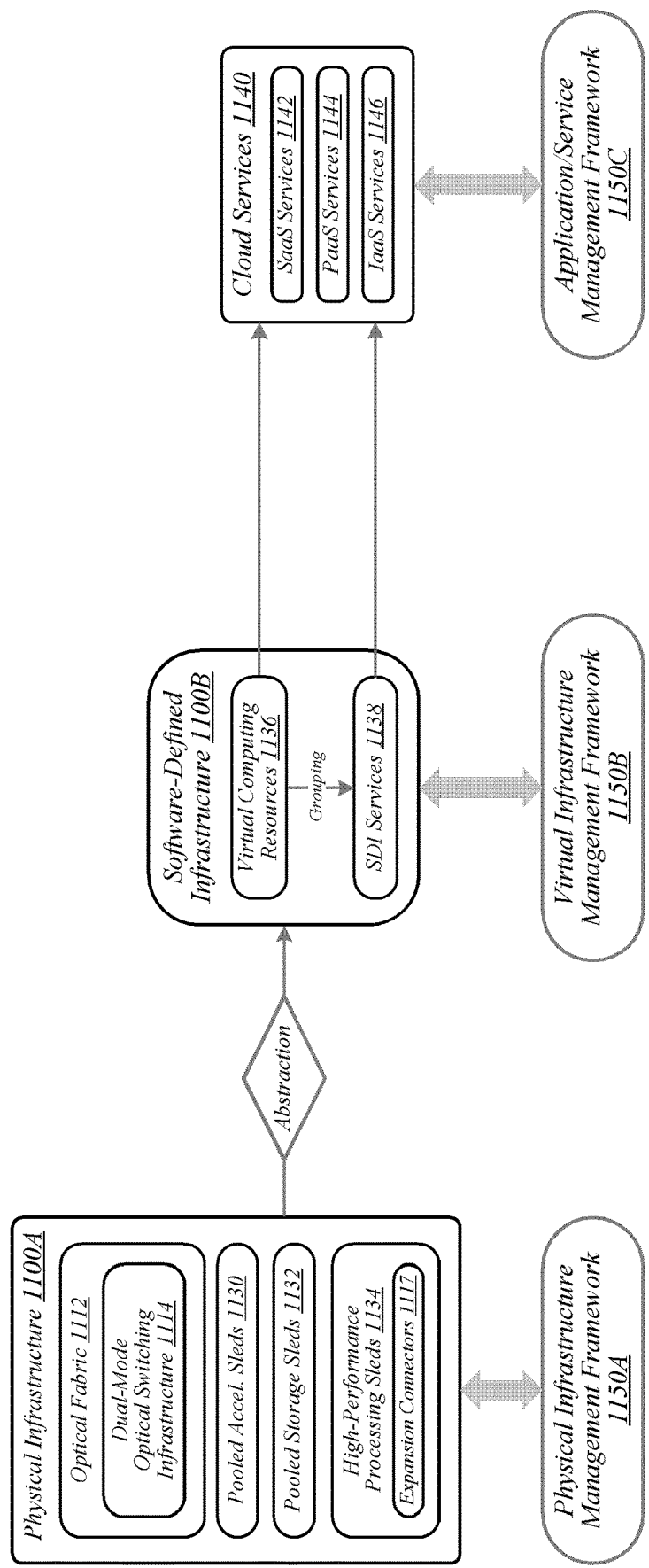
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
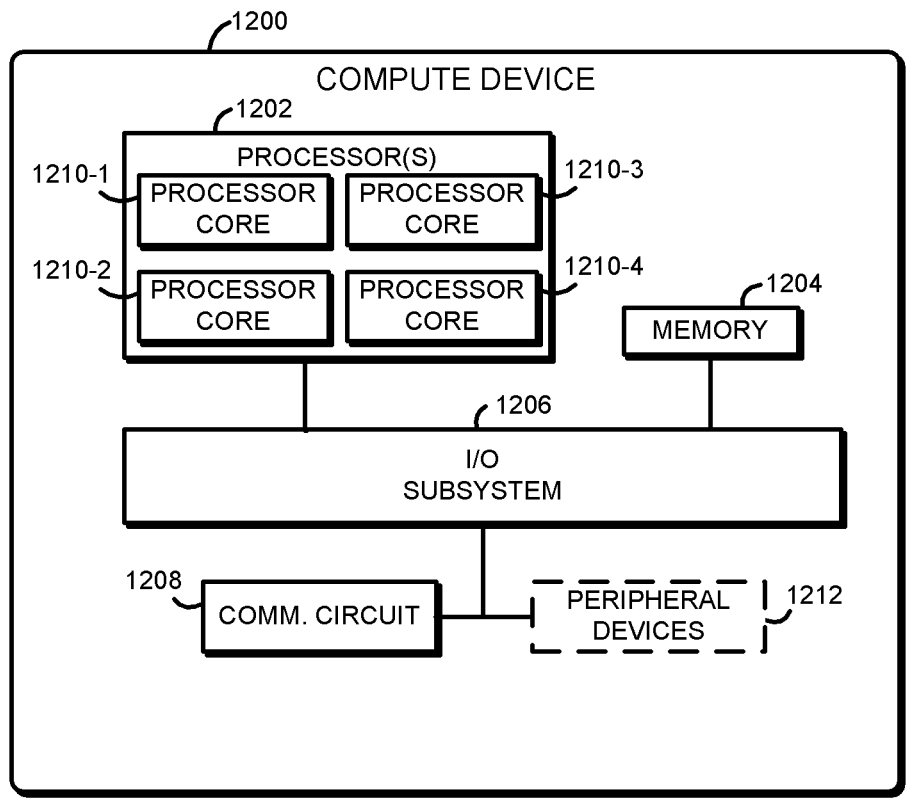
FIG. 12 is a simplified block diagram of at least one embodiment of a compute device for adaptive processing of multiple buffers.

Referring now to FIGS. 12-16, as discussed above, one or more of the sleds 204, 404, 504, 704, 1004 of the data center 100, 300, 400 may be embodied as a compute device 1200 for adaptive processing of multiple buffers. An illustrative compute device 1200 usable in the data center 100, 300, 400 is shown in FIG. 12. During operation, the compute device 1200 may receive buffer data to be processed by the compute device 1200. In one embodiment, the compute device 1200 may perform adaptive processing of multiple buffers. For example, the compute device 1200 may determine an efficient way to process the buffers in the buffer queue based on the number of buffers that are in the queue. If there are several buffers in the buffer queue, the compute device 1200 may determine that an efficient way to process the buffers is in parallel on a single processor core using single instruction, multiple data (SIMD) instructions. If there is only one buffer, the compute device 1200 may determine that an efficient way to process the buffer is using standard instructions (i.e., single instruction, single data, or SISD). In some cases, the compute device 1200 may determine that a relatively small number of buffers (but more than one, such as two) may be more efficiently processed in serial using standard instructions instead of SIMD instructions.

Referring specifically now to FIG. 12, an illustrative compute device 1200 includes a processor 1202, memory 1204, an input/output (I/O) subsystem 1206, and a communication circuit 1208. In some embodiments, one or more of the illustrative components of the compute device 1200 may be incorporated in, or otherwise form a portion of, another component. For example, the memory 1204, or portions thereof, may be incorporated in the processor 1202 in some embodiments.

The processor 1202 may be embodied as any type of processor capable of performing the functions described herein. For example, the processor 1202 may be embodied as a single or multi-core processor(s), a single or multi-socket processor, a digital signal processor, a graphics processor, a microcontroller, or other processor or processing/controlling circuit. The processor 1202 includes one or more processor cores 1210. Each processor core 1210 is capable of executing SIMD instructions, which allows the processor core 1210 to execute a single instruction on multiple data sets, such as a portion of several buffers stored in a single SIMD register. The SIMD register may be any suitable length, such as 128, 256, 512, or 1,024 bits. In some embodiments, the SIMD register may be configured to include portions of a variable number of buffers. For example, the SIMD register may be configured to include a 32-bit word from each of 8 buffers or may be configured to include a 64-bit word from each of 4 buffers. The processor 1202 may be embodied as two or more processors, each with two or more processor cores 1210.

The memory 1204 may be embodied as any type of volatile or non-volatile memory or data storage capable of performing the functions described herein. In operation, the memory 1204 may store various data and software used during operation of the compute device 1200 such as operating systems, applications, programs, libraries, and drivers. The memory 1204 is communicatively coupled to the processor 1202 via the I/O subsystem 1206, which may be embodied as circuitry and/or components to facilitate input/output operations with the processor 1202, the memory 1204, and other components of the compute device 1200. For example, the I/O subsystem 1206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The communication circuit 1208 may be embodied as any type of communication circuit, device, or collection thereof, capable of enabling communications between the compute device 1200 and other devices. To do so, the communication circuit 1208 may be configured to use any one or more communication technology and associated protocols (e.g., Ethernet, Bluetooth®, Wi-Fi®, WiMAX, near field communication (NFC), etc.) to effect such communication. In the illustrative embodiment, the communication circuit 1208 includes an optical communicator capable of sending and receiving at a high rate, such as a rate of 20, 25, 50, 100, or 200 Gigabits per second.

Of course, in some embodiments, the compute device 1200 may include other or additional components, such as those commonly found in a compute device. For example, the compute device 1200 may also have peripheral devices 1212. The peripheral devices 1212 may include data storage, a display, a keyboard, a mouse, etc.

It should be appreciated that the embodiments of the compute device 1200 described in FIG. 12 are not limiting. For example, in some embodiments, the compute device 1200 may be embodied as an accelerator sled 205-2 or a compute sled 205-4 as shown in FIG. 2, a sled 704 as shown in FIG. 7, a sled 1004 as shown in FIG. 10, or any combination of the sleds 205-5, 205-4, 704 and 1004 and the compute device 1200. Of course, any embodiment of the compute device 1200 will include the resources necessary (such as the processor cores 1210 configured to execute SIMD instructions) to perform the particular task required for a particular embodiment.

Figure 13:
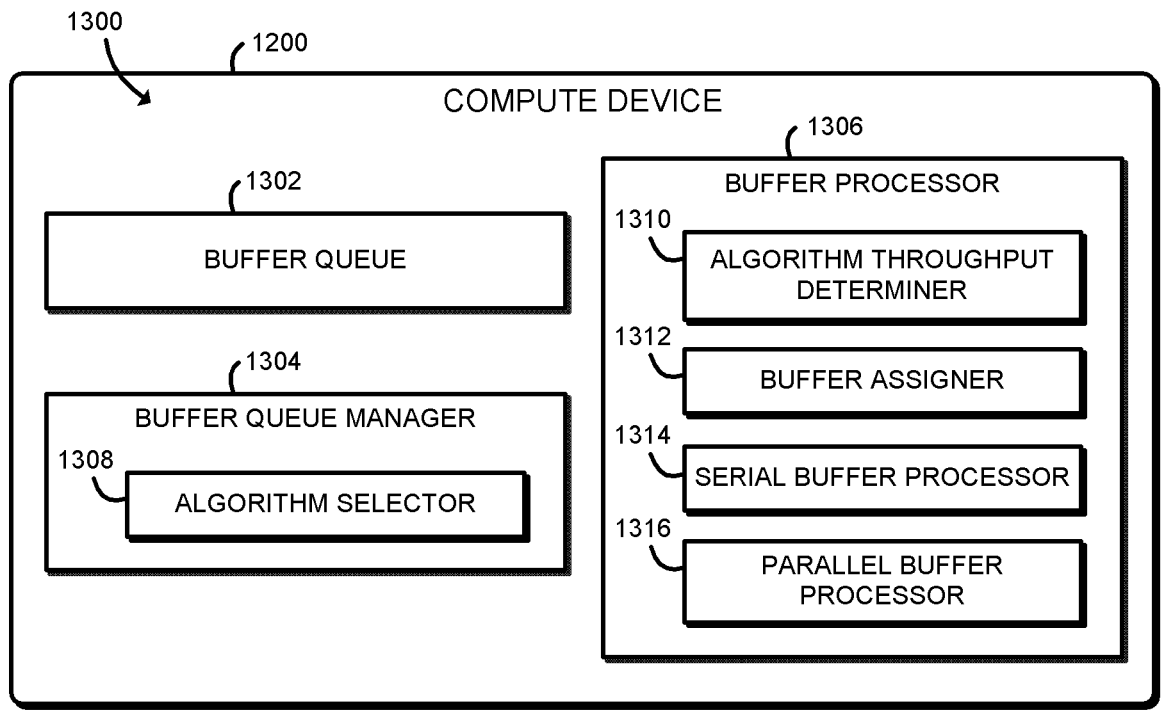
FIG. 13 is an environment that may be established by the compute device of FIG. 12.

Referring now to FIG. 13, in use, the compute device 1200 may establish an environment 1300. The illustrative environment 1300 includes a buffer queue 1302, a buffer queue manager 1304 and a buffer processor 1306. The various components of the environment 1300 may be embodied as hardware, firmware, software, or a combination thereof. As such, in some embodiments, one or more of the components of the environment 1300 may be embodied as circuitry or collection of electrical devices (e.g., a buffer queue circuit 1302, a buffer queue manager circuit 1304, a buffer processor circuit 1306, etc.). It should be appreciated that, in such embodiments, the buffer queue circuit 1302, the buffer queue manager circuit 1304, the buffer processor circuit 1306, etc., may form a portion of one or more of the processor 1202, the memory 1204, the I/O subsystem 1206, communication circuit 1208, and/or other components of the compute device 1200. For example, in an illustrative embodiment, the buffer queue manager 1304 is embodied as, or forms a portion of, one or more processors 1202. Additionally, in some embodiments, one or more of the illustrative components may form a portion of another component and/or one or more of the illustrative components may be independent of one another. Further, in some embodiments, one or more of the components of the environment 1300 may be embodied as virtualized hardware components or emulated architecture, which may be established and maintained by the processor 1202 or other components of the compute device 1200.

The buffer queue 1302 is configured to store one or more buffers to be processed. The illustrative buffer queue 1302 may be embodied as a queue data structure with a "first in first out" structure. The buffer queue 1302 may include several independent buffer queues, such as a small buffer queue and a large buffer queue. The illustrative buffer queue 1302 may be stored in the processor 1302 and/or the memory 1304. For example, the buffer queue 1302 may be stored in any type of volatile or non-volatile memory, such as Dynamic Random-Access Memory (DRAM) Dual In-line Memory Modules (DIMMs), data rate synchronous dynamic RAM (DDR SDRAM), static random-access memory (SRAM), 3-dimensional (3-D) cross-point memory, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other volatile or non-volatile memory types.

The buffer queue manager 1304 is configured to manage the buffer queue 1302. Applications may submit buffers to the buffer queue manager 1304 for the compute device 1200 to process. The applications submitting the buffers may be running on the compute device 1200 or may be running on another device and submit a buffer through a network communication. The buffer queue manager 1304 accepts the buffers submitted by applications and stores the buffers in a buffer queue for later processing. In some embodiments, the buffer queue manager 1304 may maintain several buffer queues for different size buffers. The size ranges associated with the different buffers may be any suitable size range. For example, the buffer queue manager 1304 may maintain a short buffer queue for buffers less than 1 kilobyte in size, a medium buffer queue for buffers at least 1 kilobyte in size but less than 1 megabyte in size, and a large buffer queue for buffers at least 1 megabyte in size. In some embodiments, the buffer queue manager 1304 may allow applications to submit buffers marked as latency-sensitive. The buffer queue manager 1304 may store buffers marked as latency-sensitive either in a separate latency-sensitive buffer or in the regular buffer queues.

The buffer queue manager includes an algorithm selector 1308. The algorithm selector 1308 is configured to determine an algorithm to use to process the buffers in the buffer queue manager 1304. The algorithm selector 1308 may be configured to use a particular algorithm by an operating system or other administrative process of the compute device 1200 or may be configured to use a particular algorithm by an application or user of the compute device 1200. In some embodiments, the compute device 1200 may have different buffer queues associated with different algorithms at the same time. The algorithm may be any algorithm suitable for use with SIMD instructions, such as a hashing algorithm (e.g., a Secure Hashing Algorithm 2 or SHA-2 algorithm), an encryption algorithm, or a compression algorithm.

The buffer processor 1306 is configured to process the buffers stored in the buffer queue and provide the processed buffers to the corresponding requesting applications. The buffer processor 1306 includes an algorithm throughput determiner 1310, a buffer assigner 1312, a serial buffer processor 1314, and a parallel buffer processor 1316. The algorithm throughput determiner 1310 is configured to determine a throughput of the algorithm selected by the algorithm selector 1308. The algorithm throughput determiner 1310 is configured to determine a throughput of the algorithm when executed using standard SISD instructions as well as a throughput of the algorithm for each buffer when executed using SIMD instructions. It should be appreciated that the SIMD throughput per buffer when instructions may be lower than the SISD throughput, due to differences in the hardware used to execute SIMD instructions as compared to SISD instructions. In fact, in some embodiments and for some algorithms, the SISD throughput may be more than twice the SIMD throughput per buffer. In such a case, the compute device 1200 may be able to serially process two buffers using SISD instructions faster than the compute device 1200 could process the same two buffers using SIMD instructions. In the illustrative embodiment, the SISD throughput is always at least as high as the SIMD throughput per buffer. In other embodiments, the SISD throughput may be lower than the SIMD throughput per buffer for particular algorithms or for a particular architectural configuration of a processor core 1210. The ratio of the SISD throughput to the SIMD throughput per buffer may be any value, such as 0.5, 0.75, 1, 1.1, 1.2, 1.25, 1.5, 1.75, 2, 3, 5, 10, or any value between 0.5 and 10.

The buffer assigner 1312 is configured to assign one or more buffers from the buffer queue to one or more threads. The buffer assigner 1312 is configured to determine an efficient way to assign the buffers based on the SISD throughput, the SIMD throughput per buffer, and the number of buffers to be processed. A total SIMD throughput of a single processor core 1210 can be determined by multiplying the SIMD throughput per buffer times the number of buffers to be processed (up to a maximum number of buffers, discussed below). If the SISD throughput is higher than the total SIMD throughput for the given number of buffers in the buffer queue, then the buffer assigner 1312 assigns each buffer of the buffer queue to a thread to be executed using SISD instructions. If there is more than one buffer in such a scenario, the buffer assigner 1312 may assign more than one buffer to a single thread or may assign each buffer to a different thread.

The buffer assigner 1312 may assign any number of buffers to be processed to a single thread up to the maximum number of buffers. The maximum number of buffers may be determined by a ratio of the width of the SIMD registers to the word size of the particular algorithm used. For example, if the width of the SIMD registers is 256 bits and the word size for a particular algorithm is 32 bits, then the maximum number of buffers for a single thread is 256/32=8. If the number of buffers to be executed is more than the maximum number of buffers, then the maximum number of buffers is assigned to a single thread, and the remaining buffers are assigned as described above.

In the illustrative embodiment, the buffer assigner 1312 may only assign buffers to a primary thread associated with each queue or to threads that are available to receive buffers from a thread pool that may be shared by several queues. The number of threads in the thread pool may be determined based on the number of queues managed by the buffer queue manager 1304 and the number of processor cores 1210. For example, the number of threads in the thread pool may be equal to the number of buffer queues plus the number of processor cores 1210 minus 1.

In the illustrative embodiment, some of the buffers in the buffer queues may be marked as latency-sensitive buffers. The illustrative buffer assigner 1312 may preferentially assign latency-sensitive buffers to be processed before other buffers in the buffer queue and may assign the latency-sensitive buffers to be processed with SISD instructions even if processing the buffers with SISD instructions would not be an efficient manner of processing all of the buffers in the buffer queue.

The serial buffer processor 1314 is configured to serially process assigned buffers. In particular, the serial buffer processor 1314 is configured to process assigned buffers using SISD instructions. It should appreciated that, as used herein, serially processing buffers refers to processing buffers one at a time (i.e., not substantially in parallel, or otherwise contemporaneously with each other, using SIMD instructions), and, as such, a single buffer may be said to be serially processed. The parallel buffer processor 1316 is configured to process two or more buffers in parallel using SIMD instructions.

In the illustrative embodiment, each of the serial buffer processor 1314 and the parallel buffer processor 1316 is configured to check for new buffers in the queue after processing a portion of the buffers to be processed. The buffer processors 1314 and 1316 may check for new buffers after a certain period of time has elapsed, after processing a certain amount of the buffer, or upon receipt of an interrupt or other message indicating that a new buffer may be present. The buffer processors 1314 and 1316 are configured to analyze an efficient way to process both the buffers currently being processed as well as the new buffers in the queue in the same manner as described above. The buffer processors 1314 and 1316 may continue processing the buffers previously assigned as well as the new buffers. For example, the serial buffer processor 1314 may begin performing a hash on an assigned buffer. After processing a portion of the buffer, the serial buffer processor 1314 may check for new buffers in the buffer queue and find two new buffers. The serial buffer processor 1314 may determine that an efficient way to process the currently-assigned buffer and the two new buffers is by processing all three buffers together in parallel with SIMD instructions. It should be appreciated that the hashing algorithm of the currently-assigned buffer does not need to be restarted, but instead the same hashing algorithm may be simultaneously applied to all three buffers, even though the hashing of the currently-assigned buffer has already been partially completed. Of course, in some embodiments, an appropriate initialization procedure associated with the algorithm may need to be followed for the two new buffers and not for the currently-assigned buffer.

Once the buffer processors 1314 and 1316 complete the processing of the assigned buffers, the buffer processors 1314 and 1316 return the processed buffer to the requesting application (e.g., the buffer processors 1314 and 1316 may return a hash value if the algorithm is a hash or may return an encrypted version of the buffer in the algorithm is an encryption algorithm). It should be appreciated that, in some embodiments, the parallel buffer processor 1316 may complete processing some of its buffers before completing processing of others of its buffers, and send the corresponding completed results to the requesting applications prior to completing the rest of the buffers. In some cases, the parallel buffer processor 1316 may change to a serial processing of the remaining buffers if that would be more efficient after completing processing some of its buffers.

Figure 14:
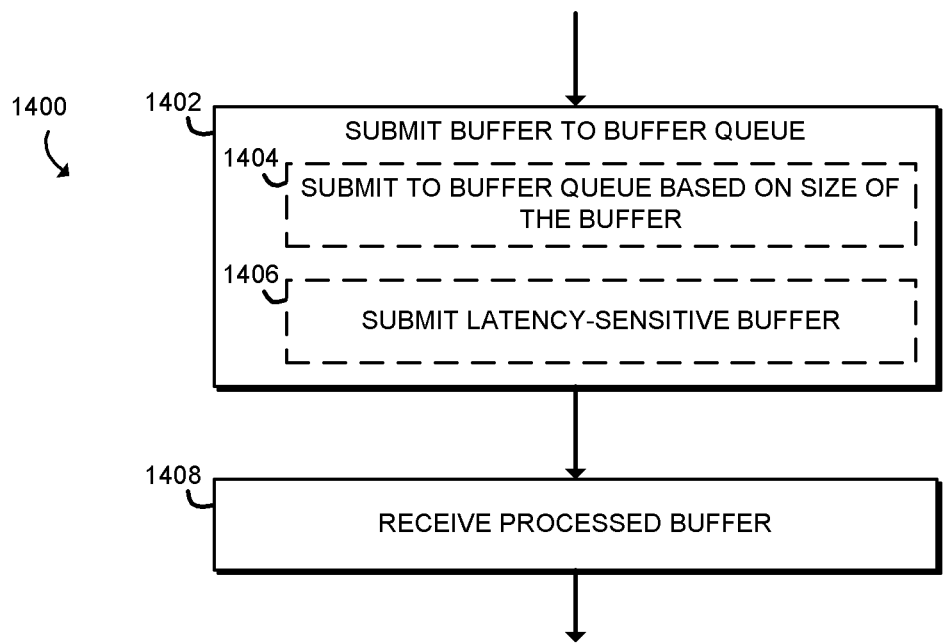
FIG. 14 is at least one embodiment of a flowchart of a method for submitting a buffer to a buffer queue for processing that may be executed by the compute device of FIG. 12.

Referring now to FIG. 14, in use, the compute device 1200 may execute a method 1400 for submitting a buffer to a buffer queue. The method 1400 may be executed by, e.g., an application being executed on the compute device 1200. The method 1400 begins in block 1402, in which the compute device 1200 submits a buffer to the buffer queue. In some embodiments, the compute device 1200 submits a buffer to a buffer queue based on a size of the buffer in block 1404. For example, a small buffer may be submitted to a small buffer queue and a large buffer may be submitted to a large buffer queue. Additionally or alternatively, in some embodiments, the compute device 1200 submits a latency-sensitive buffer to the buffer queue in block 1406.

Figure 15:
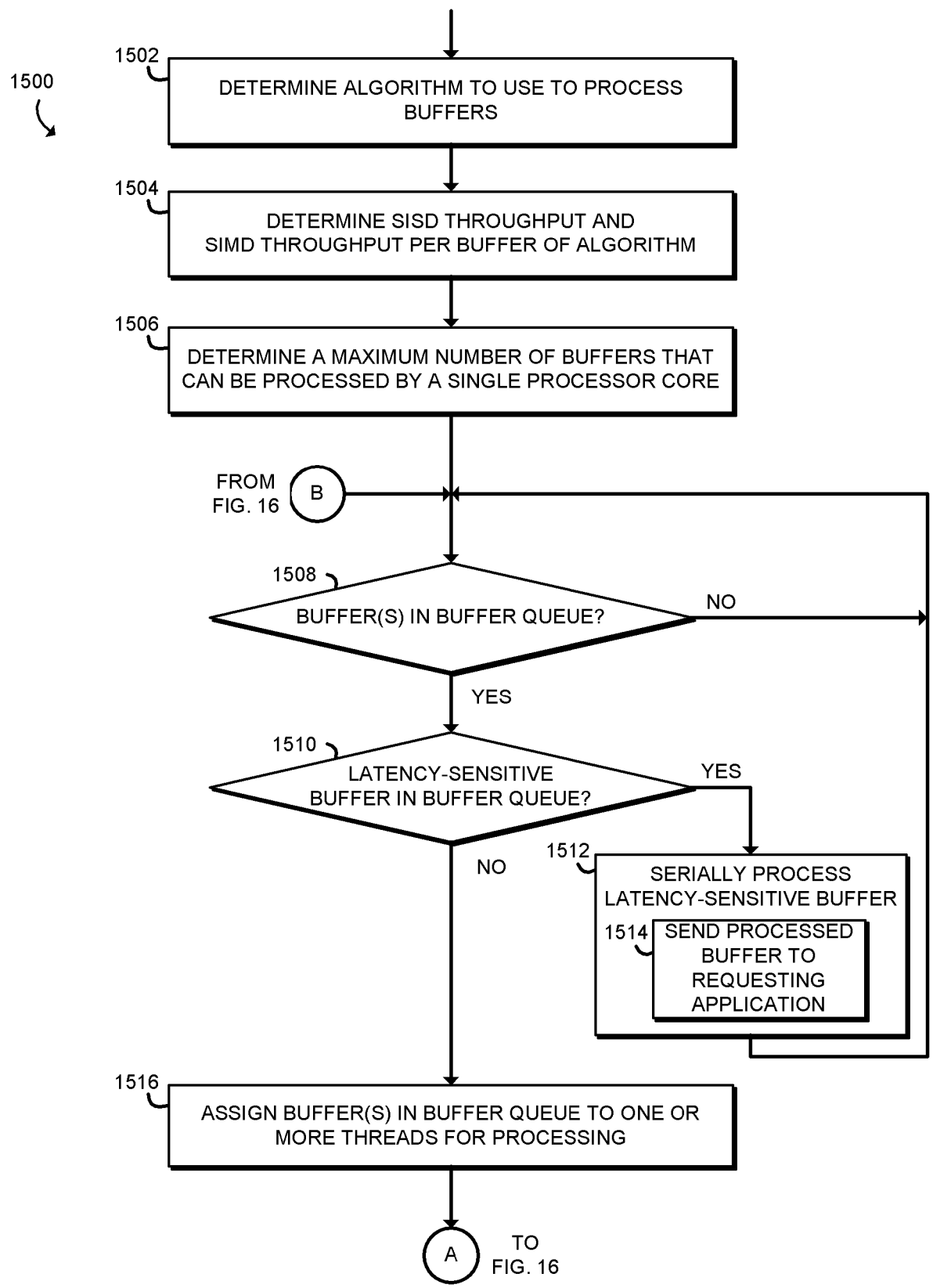
FIGS. 15 & 16 are at least one embodiment of a flowchart of a method for adaptive processing of multiple buffers that may be executed by the compute device of FIG. 12.
Figure 16:
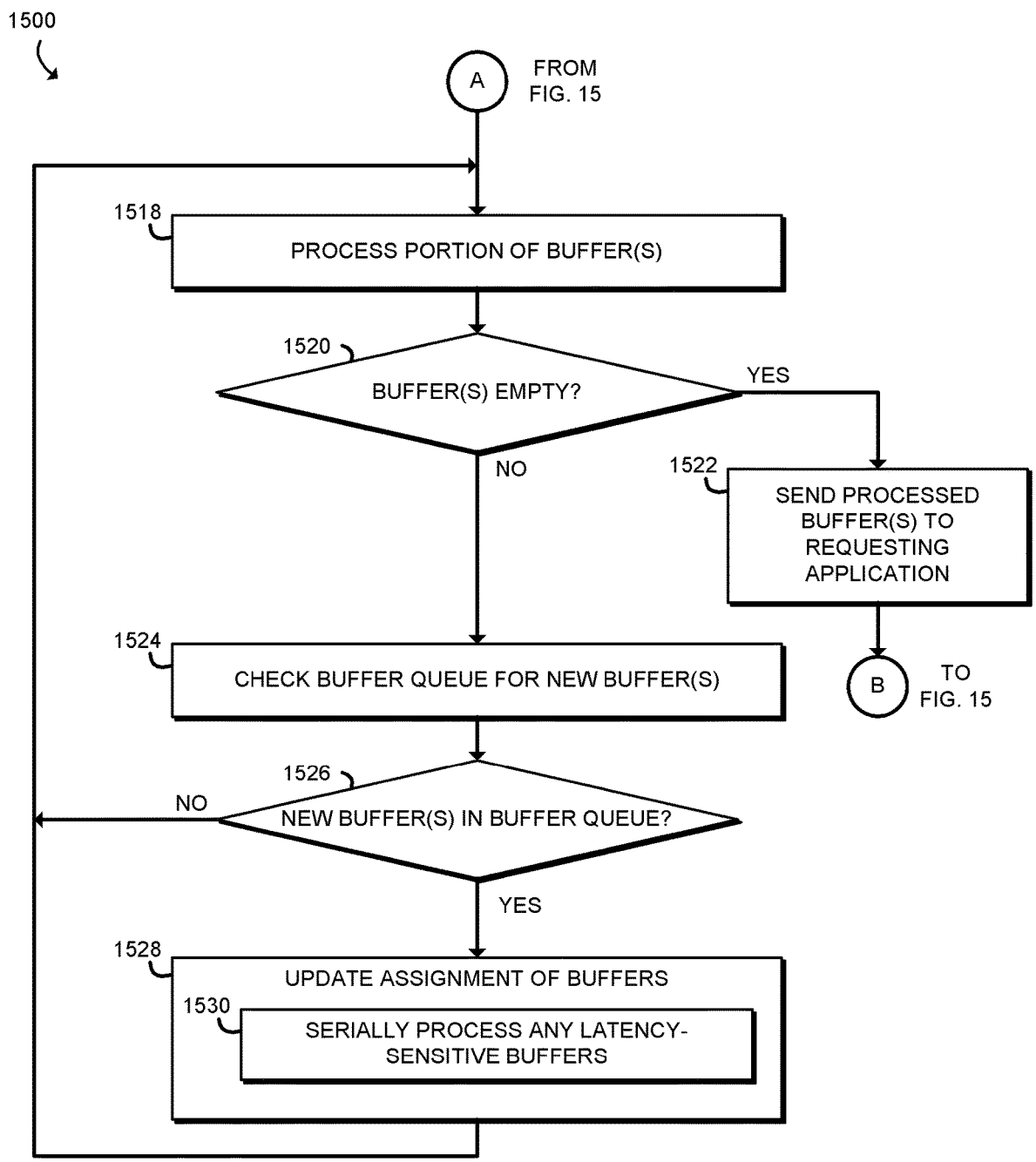

After the compute device 1200 submits a buffer to the buffer queue, the compute device 1200 must wait for the buffer to be processed, as described in more detail in FIGS. 15 & 16. After the buffer is processed, the compute device 1200 receives the processed buffer in block 1408. Depending on the particular algorithm being implemented, the processed buffer may be embodied as a hash value, an encrypted version of the submitted buffer, a compressed version of the submitted buffer, etc.

Referring now to FIG. 15, in use, the compute device 1200 may execute a method 1500 for adaptively processing multiple buffers. The method 1500 begins in block 1502, in which the compute device 1200 determines an algorithm to use to process the buffers. The compute device 1200 may determine the algorithm using any suitable methodology, such as by accessing a saved setting on the compute device 1200, receiving an instruction from another application running on the compute device 1200, or receiving an instruction from a user of the compute device 1200. The algorithm may be embodied as any algorithm suitable for processing a buffer, such as a hash algorithm, an encryption/decryption algorithm, or a compression/decompression algorithm.

In block 1504, the compute device 1200 determines a SISD throughput (i.e., a throughput of the algorithm using serial processing with SISD instructions) and a SIMD throughput per buffer (i.e., a throughput of the algorithm using parallel processing with SIMD instructions). The compute device 1200 may determine the SISD and SIMD throughputs using any suitable methodology, such as by processing test buffers or by accessing a value saved on the compute device 1200.

In block 1506, the compute device 1200 determines a maximum number of buffers that can be processed by a single processor core 1210 at the same time. The maximum number of buffers is determined by ratio of the width of the SIMD registers to the word size of the particular algorithm used. For example, if the width of the SIMD registers is 256 bits and the word size for a particular algorithm is 32 bits, then the maximum number of buffers for a single thread is 256/32=8.

In block 1508, if there are no buffers in the buffer queue, then the method 1500 loops back to block 1508. If there is one or more buffers in the buffer queue, then the method 1500 proceeds to block 1510.

In block 1510, if there is a latency-sensitive buffer in the buffer queue, then the method 1500 proceeds to block 1512, in which the compute device 1200 serially processes the latency-sensitive buffer and, in block 1514, the compute device 1200 sends the processed buffer to the requesting application. The method 1500 then loops back to block 1508 to check for more buffers in the buffer queue.

Referring back to block 1510, if there is not a latency-sensitive buffer in the buffer queue, then the method 1500 proceeds to block 1516, in which the compute device 1200 assigns buffers in the buffer queue to one or more threads for processing. The compute device 1200 assigns the buffers such that they are processed in an efficient manner based on the SISD throughput, the SIMD throughput per buffer, and the number of buffers to be processed. A total SIMD throughput of a single processor core 1210 can be determined by multiplying the SIMD throughput per buffer times the number of buffers to be processed (up to the maximum number of buffers). If the SISD throughput is higher than the total SIMD throughput for the given number of buffers in the buffer queue, then the compute device 1200 assigns each buffer of the buffer queue to a thread to be executed using SISD instructions. If there is more than one buffer in such a scenario, the compute device 100 may assign more than one buffer to a single thread or may assign each buffer to a different thread. If the number of buffers to be executed is more than the maximum number of buffers, then the maximum number of buffers is assigned to a single thread, and the remaining buffers are assigned as described above.

Referring now to FIG. 16, after the compute device 1200 has assigned the buffers in the buffer queue, the method 1500 proceeds to block 1518 of FIG. 16. In block 1518, the compute device 1200 processes a portion of the assigned buffers. The compute device 1200 may continue processing the buffers until a reference threshold has been achieved such as a certain amount of the buffers has been processed, until a certain time has elapsed, until an interrupt or other message is received, until a buffer is completely processed, etc.

In block 1520, if the buffers are empty (i.e., fully processed), the method 1500 proceeds to block 1522, in which the processed buffers are sent to the requesting application. The method 1500 then proceeds to block 1508 in FIG. 15. It should be appreciated that, in some embodiments, if some of the buffers are empty but others are not, the compute device 1200 may send the completely processed buffers to the requesting applications and continue processing the remaining buffers.

Referring back to block 1520, if the buffers are not empty, the method 1500 proceeds to block 1524, in which the compute device 1200 checks the buffer queue for new buffers. In block 1526, if no new buffers are found in the buffer queue, the method 1500 loops back to block 1518 to continue to process the buffers. If new buffers are found in the buffer queue, the method 1500 proceeds to block 1528, in which the compute device 1200 updates the assignment of buffers to the appropriate threads using the same approach described above. It should be appreciated that, in some embodiments, such a reassignment may result in a thread beginning to process a buffer serially with SISD instructions and then complete processing the buffer in parallel with other buffers with SIMD instructions. If the compute device 1200 finds any latency-sensitive buffers in the buffer queue, the compute device 1200 serially processes the latency-sensitive buffers in block 1530 before continuing with the processing of the assigned buffers. The method 1500 then loops back to block 1518 to continue processing the assigned buffers.

EXAMPLES

Illustrative examples of the devices, systems, and methods disclosed herein are provided below. An embodiment of the devices, systems, and methods may include any one or more, and any combination of, the examples described below.

Example 1 includes a compute device for adaptive processing of multiple buffers, the compute device comprising a processor comprising one or more processor cores; a buffer queue manager to determine a number of buffers in a buffer queue; and a buffer processor to determine, based on the number of buffers, whether to process the buffer queue in parallel in a single processor core of the one or more processor cores with single instruction, multiple data (SIMD) instructions; process, if the compute device is to process the buffer queue in parallel in the single processor core, two or more buffers in the buffer queue with the SIMD instructions; and serially process, if the compute device is not to process the buffer queue in parallel with the single processor core, one or more buffers in the buffer queue.

Example 2 includes the subject matter of Example 1, and wherein the buffer queue manager is further to determine an algorithm to be applied to buffers in the buffer queue, and wherein the buffer processor is further to determine a throughput per buffer of the algorithm when processed in parallel in the single processor core; and determine a throughput per buffer of the algorithm when serially processed in the single processor core, wherein to determine whether to process the buffer queue in parallel in the single processor core with the SIMD instructions comprises to determine whether to process the buffer queue in parallel in the single processor core with the SIMD instructions based on the throughput per buffer of the algorithm when processed in parallel in the single processor core and the throughput per buffer of the algorithm when serially processed in the single processor core.

Example 3 includes the subject matter of any of Examples 1 and 2, and wherein the throughput per buffer of the algorithm when processed in parallel in the single processor core is less than half of the throughput per buffer of the algorithm when serially processed in the single processor core and more one third of the throughput per buffer of the algorithm when serially processed in the single processor core, wherein to determine, based on the number of buffers, whether to process the buffer queue with the SIMD instructions comprises to determine a total throughput of the algorithm when processed in parallel in the single processor core with the SIMD instructions by multiplication of the throughput per buffer of the algorithm when processed in parallel in the single processor core by the number of buffers; determine a total throughput of the algorithm when serially processed in the single processor core by multiplication of the throughput per buffer of the algorithm when serially processed in the single processor core by the number of buffers; and determine whether the total throughput of algorithm when processed in parallel in the single processor core is higher than the total throughput of the algorithm when serially processed in the single processor core, wherein to process two or more buffers in the buffer queue in parallel in the single processor core comprises to process, if the number of buffers is at least three, three or more buffers in parallel in the single processor core in response to a determination that the total throughput of the algorithm when processed in parallel in the single processor core is higher than the total throughput of the algorithm when serially processed in the single processor core, and wherein to process one or more buffers in the buffer queue with the SIMD instructions comprises to serially process, if the number of buffers is at most two, one or two buffers in response to a determination that the total throughput of the algorithm when processed in parallel in the single processor core is not higher than the total throughput of the algorithm when serially processed in the single processor core.

Example 4 includes the subject matter of any of Examples 1-3, and wherein the buffer queue manager is further to receive a buffer to be processed, and wherein the buffer processor is further to assign, based on a length of the buffer, the buffer to the buffer queue of a plurality of buffer queues, wherein each buffer queue of the plurality of buffer queues is associated with a different range of buffer lengths.

Example 5 includes the subject matter of any of Examples 1-4, and wherein to determine the number of buffers in the buffer queue comprises to determine, for each buffer queue of the plurality of buffer queues, a number of buffers in the corresponding buffer queue, wherein to determine, based on the number of buffers, whether to process the buffer queue in parallel in the single processor core with the SIMD instructions comprises to determine, for each buffer queue of the plurality of buffer queues and based on the corresponding number of buffers, whether to process the corresponding buffer queue in parallel in the single processor core with the SIMD instructions, wherein to process, if the compute device is to process the buffer queue in parallel in the single processor core, the two or more buffers in the buffer queue in parallel in the single processor core comprises to process, for each buffer queue of the plurality of buffer queues, the two or more buffers in the corresponding buffer queue in parallel in the single processor core if the compute device is to process the corresponding buffer queue in parallel in the single processor core, and wherein to serially process, if the compute device is not to process the buffer queue in parallel in the single processor core, the one or more buffers in the buffer queue comprises to serially process, for each buffer queue of the plurality of buffer queues, the one or more buffers in the corresponding buffer queue instructions if the compute device is not to process the corresponding buffer queue in parallel in the single processor core.

Example 6 includes the subject matter of any of Examples 1-5, and wherein to serially process the two or more buffers in the buffer queue in parallel in the single processor core comprises to receive, after a determination that the compute device is to process the buffer queue in parallel in the single processor core, a latency-sensitive buffer to be processed; serially process, prior to completion of processing of the two or more buffers, the latency-sensitive buffer.

Example 7 includes the subject matter of any of Examples 1-6, and wherein to process the two or more buffers in the buffer queue in parallel in the single processor core comprises to process, by a primary thread of the compute device, a maximum number of buffers in parallel in the single processor core, wherein the maximum number of buffers is the highest number of buffers that can be contemporaneously processed by the single processor with the SIMD instructions; determine a number of remaining buffers in the buffer queue; determine, based on the number of remaining buffers, whether to process the remaining buffers in the buffer queue in parallel in the single processor core with the SIMD instructions; process, by a secondary thread of the compute device and if the compute device is to process the remaining buffers in the buffer queue in parallel in the single processor core, the remaining buffers in the buffer queue in parallel in the single processor core; and serially process, by the secondary thread of the compute device and if the compute device is not to process the remaining buffers in the buffer queue in parallel in the single processor core, the remaining buffers in the buffer queue.

Example 8 includes the subject matter of any of Examples 1-7, and wherein to process the two or more buffers in the buffer queue in parallel in the single processor core comprises to process a portion of the two or more buffers; determine, in response to a completion of processing the portion of the two or more buffers, whether new buffers are in the buffer queue; process, in response to a determination that the new buffers are in the buffer queue, the two or more buffers and the new buffers in parallel in the single processor core, wherein to process the two or more buffers and the new buffers comprises to continue to process the two or more buffers beginning at the end of the processed portion of the two or more buffers.

Example 9 includes the subject matter of any of Examples 1-8, and wherein to serially process the one or more buffers in the buffer queue comprises to process a portion of the one or more buffers; determine, in response to a completion of processing the portion of the one or more buffers, whether new buffers are in the buffer queue; determine, in response to a determination that the new buffers are in the buffer queue, whether to process the one or more buffers and the new buffers in parallel in the single processor core with SIMD instructions; process, in response to a determination to process the one or more buffers and the new buffers in parallel in the single processor core, the one or more buffers and the new buffers in parallel in the single processor core, wherein to process the one or more buffers and the new buffers comprises to continue to process the one or more buffers beginning at the end of the processed portion of the one or more buffers.

Example 10 includes the subject matter of any of Examples 1-9, and wherein to process the two or more buffers in the buffer queue in parallel in the single processor core comprises to perform a hash algorithm on each buffer of the two or more buffers.

Example 11 includes the subject matter of any of Examples 1-10, and wherein the hash algorithm is a Secure Hash Algorithm 2 (SHA-2) algorithm.

Example 12 includes the subject matter of any of Examples 1-11, and wherein to process the two or more buffers in the buffer queue in parallel in the single processor core comprises to perform an encryption algorithm on each buffer of the two or more buffers.

Example 13 includes the subject matter of any of Examples 1-12, and wherein to process the two or more buffers in the buffer queue in parallel in the single processor core comprises to perform a compression algorithm on each buffer of the two or more buffers.

Example 14 includes a method for adaptive processing of multiple buffers on a compute device, the method comprising determining, by the compute device, a number of buffers in a buffer queue; determining, by the compute device and based on the number of buffers, whether to process the buffer queue in parallel in a single processor core of the compute device with single instruction, multiple data (SIMD) instructions; processing, by the compute device and if the compute device is to process the buffer queue in parallel in the single processor core, two or more buffers in the buffer queue with the SIMD instructions; and serially processing, by the compute device and if the compute device is not to process the buffer queue in parallel with the single processor core, one or more buffers in the buffer queue.

Example 15 includes the subject matter of Example 14, and further including determining, by the compute device, an algorithm to be applied to buffers in the buffer queue; determining, by the compute device, a throughput per buffer of the algorithm when processed in parallel in the single processor core; and determining, by the compute device, a throughput per buffer of the algorithm when serially processed in the single processor core, wherein determining whether to process the buffer queue in parallel in the single processor core with the SIMD instructions comprises determining whether to process the buffer queue in parallel in the single processor core with the SIMD instructions based on the throughput per buffer of the algorithm when processed in parallel in the single processor core and the throughput per buffer of the algorithm when serially processed in the single processor core.

Example 16 includes the subject matter of any of Examples 14 and 15, and wherein the throughput per buffer of the algorithm when processed in parallel in the single processor core is less than half of the throughput per buffer of the algorithm when serially processed in the single processor core and more one third of the throughput per buffer of the algorithm when serially processed in the single processor core, wherein determining, based on the number of buffers, whether to process the buffer queue with the SIMD instructions comprises determining a total throughput of the algorithm when processed in parallel in the single processor core with the SIMD instructions by multiplying the throughput per buffer of the algorithm when processed in parallel in the single processor core by the number of buffers; determining a total throughput of the algorithm when serially processed in the single processor core by multiplying the throughput per buffer of the algorithm when serially processed in the single processor core by the number of buffers; and determining whether the total throughput of algorithm when processed in parallel in the single processor core is higher than the total throughput of the algorithm when serially processed in the single processor core, wherein processing two or more buffers in the buffer queue in parallel in the single processor core comprises processing, if the number of buffers is at least three, three or more buffers in parallel in the single processor core in response to a determination that the total throughput of the algorithm when processed in parallel in the single processor core is higher than the total throughput of the algorithm when serially processed in the single processor core, and wherein processing one or more buffers in the buffer queue with the SIMD instructions comprises serially processing, if the number of buffers is at most two, one or two buffers in response to a determination that the total throughput of the algorithm when processed in parallel in the single processor core is not higher than the total throughput of the algorithm when serially processed in the single processor core.

Example 17 includes the subject matter of any of Examples 14-16, and further including receiving, by the compute device, a buffer for processing; and assigning, by the compute device and based on a length of the buffer, the buffer to the buffer queue of a plurality of buffer queues, wherein each buffer queue of the plurality of buffer queues is associated with a different range of buffer lengths.

Example 18 includes the subject matter of any of Examples 14-17, and wherein determining the number of buffers in the buffer queue comprises determining, for each buffer queue of the plurality of buffer queues, a number of buffers in the corresponding buffer queue, wherein determining, based on the number of buffers, whether to process the buffer queue in parallel in the single processor core with the SIMD instructions comprises determining, for each buffer queue of the plurality of buffer queues and based on the corresponding number of buffers, whether to process the corresponding buffer queue in parallel in the single processor core with the SIMD instructions, wherein processing, if the compute device is to process the buffer queue in parallel in the single processor core, the two or more buffers in the buffer queue in parallel in the single processor core comprises processing, for each buffer queue of the plurality of buffer queues, the two or more buffers in the corresponding buffer queue in parallel in the single processor core if the compute device is to process the corresponding buffer queue in parallel in the single processor core, and wherein serially processing, if the compute device is not to process the buffer queue in parallel in the single processor core, the one or more buffers in the buffer queue comprises serially processing, for each buffer queue of the plurality of buffer queues, the one or more buffers in the corresponding buffer queue instructions if the compute device is not to process the corresponding buffer queue in parallel in the single processor core.

Example 19 includes the subject matter of any of Examples 14-18, and wherein serially processing the two or more buffers in the buffer queue in parallel in the single processor core comprises receiving, by the compute device and after a determination that the compute device is to process the buffer queue in parallel in the single processor core, a latency-sensitive buffer for processing; serially processing, by the compute device and prior to completing the processing of the two or more buffers, the latency-sensitive buffer.

Example 20 includes the subject matter of any of Examples 14-19, and wherein processing the two or more buffers in the buffer queue in parallel in the single processor core comprises processing, by a primary thread of the compute device, a maximum number of buffers in parallel in the single processor core, wherein the maximum number of buffers is the highest number of buffers that can be contemporaneously processed by the single processor with the SIMD instructions; determining, by the compute device, a number of remaining buffers in the buffer queue; determining, by the compute device and based on the number of remaining buffers, whether to process the remaining buffers in the buffer queue in parallel in the single processor core with the SIMD instructions; processing, by a secondary thread of the compute device and if the compute device is to process the remaining buffers in the buffer queue in parallel in the single processor core, the remaining buffers in the buffer queue in parallel in the single processor core; and serially processing, by the secondary thread of the compute device and if the compute device is not to process the remaining buffers in the buffer queue in parallel in the single processor core, the remaining buffers in the buffer queue.

Example 21 includes the subject matter of any of Examples 14-20, and wherein processing the two or more buffers in the buffer queue in parallel in the single processor core comprises processing a portion of the two or more buffers; determining, in response to processing the portion of the two or more buffers, whether new buffers are in the buffer queue; processing, in response to a determination that the new buffers are in the buffer queue, the two or more buffers and the new buffers in parallel in the single processor core, wherein processing the two or more buffers and the new buffers comprises continuing to process the two or more buffers beginning at the end of the processed portion of the two or more buffers.

Example 22 includes the subject matter of any of Examples 14-21, and wherein serially processing the one or more buffers in the buffer queue comprises processing a portion of the one or more buffers; determining, in response to processing the portion of the one or more buffers, whether new buffers are in the buffer queue; determining, in response to a determination that the new buffers are in the buffer queue, whether to process the one or more buffers and the new buffers in parallel in the single processor core with SIMD instructions; processing, in response to a determination to process the one or more buffers and the new buffers in parallel in the single processor core, the one or more buffers and the new buffers in parallel in the single processor core, wherein processing the one or more buffers and the new buffers comprises continuing to process the one or more buffers beginning at the end of the processed portion of the one or more buffers.

Example 23 includes the subject matter of any of Examples 14-22, and wherein processing the two or more buffers in the buffer queue in parallel in the single processor core comprises performing a hash algorithm on each buffer of the two or more buffers.

Example 24 includes the subject matter of any of Examples 14-23, and wherein the hash algorithm is a Secure Hash Algorithm 2 (SHA-2) algorithm.

Example 25 includes the subject matter of any of Examples 14-24, and wherein processing the two or more buffers in the buffer queue in parallel in the single processor core comprises performing an encryption algorithm on each buffer of the two or more buffers.

Example 26 includes the subject matter of any of Examples 14-25, and wherein processing the two or more buffers in the buffer queue in parallel in the single processor core comprises performing a compression algorithm on each buffer of the two or more buffers.

Example 27 includes one or more computer-readable media comprising a plurality of instructions stored thereon that, when executed, causes a compute device to perform the method of any of Examples 15-26.

Example 28 includes a compute device for adaptive processing of multiple buffers, the compute device comprising means for determining, a number of buffers in a buffer queue; means for determining, based on the number of buffers, whether to process the buffer queue in parallel in a single processor core of the compute device with single instruction, multiple data (SIMD) instructions; means for processing, if the compute device is to process the buffer queue in parallel in the single processor core, two or more buffers in the buffer queue with the SIMD instructions; and means for serially processing, if the compute device is not to process the buffer queue in parallel with the single processor core, one or more buffers in the buffer queue.

Example 29 includes the subject matter of Example 28, and further including means for determining an algorithm to be applied to buffers in the buffer queue; means for determining a throughput per buffer of the algorithm when processed in parallel in the single processor core; and means for determining a throughput per buffer of the algorithm when serially processed in the single processor core, wherein the means for determining whether to process the buffer queue in parallel in the single processor core with the SIMD instructions comprises means for determining whether to process the buffer queue in parallel in the single processor core with the SIMD instructions based on the throughput per buffer of the algorithm when processed in parallel in the single processor core and the throughput per buffer of the algorithm when serially processed in the single processor core.

Example 30 includes the subject matter of any of Examples 28 and 29, and wherein the throughput per buffer of the algorithm when processed in parallel in the single processor core is less than half of the throughput per buffer of the algorithm when serially processed in the single processor core and more one third of the throughput per buffer of the algorithm when serially processed in the single processor core, wherein the means for determining, based on the number of buffers, whether to process the buffer queue with the SIMD instructions comprises means for determining a total throughput of the algorithm when processed in parallel in the single processor core with the SIMD instructions by multiplying the throughput per buffer of the algorithm when processed in parallel in the single processor core by the number of buffers; means for determining a total throughput of the algorithm when serially processed in the single processor core by multiplying the throughput per buffer of the algorithm when serially processed in the single processor core by the number of buffers; and means for determining whether the total throughput of algorithm when processed in parallel in the single processor core is higher than the total throughput of the algorithm when serially processed in the single processor core, wherein the means for processing two or more buffers in the buffer queue in parallel in the single processor core comprises processing, if the number of buffers is at least three, three or more buffers in parallel in the single processor core in response to a determination that the total throughput of the algorithm when processed in parallel in the single processor core is higher than the total throughput of the algorithm when serially processed in the single processor core, and wherein the means for processing one or more buffers in the buffer queue with the SIMD instructions comprises serially means for processing, if the number of buffers is at most two, one or two buffers in response to a determination that the total throughput of the algorithm when processed in parallel in the single processor core is not higher than the total throughput of the algorithm when serially processed in the single processor core.

Example 31 includes the subject matter of any of Examples 28-30, and further including means for receiving a buffer for processing; and means for assigning, based on a length of the buffer, the buffer to the buffer queue of a plurality of buffer queues, wherein each buffer queue of the plurality of buffer queues is associated with a different range of buffer lengths.

Example 32 includes the subject matter of any of Examples 28-31, and wherein the means for determining the number of buffers in the buffer queue comprises means for determining, for each buffer queue of the plurality of buffer queues, a number of buffers in the corresponding buffer queue, wherein the means for determining, based on the number of buffers, whether to process the buffer queue in parallel in the single processor core with the SIMD instructions comprises means for determining, for each buffer queue of the plurality of buffer queues and based on the corresponding number of buffers, whether to process the corresponding buffer queue in parallel in the single processor core with the SIMD instructions, wherein the means for processing, if the compute device is to process the buffer queue in parallel in the single processor core, the two or more buffers in the buffer queue in parallel in the single processor core comprises means for processing, for each buffer queue of the plurality of buffer queues, the two or more buffers in the corresponding buffer queue in parallel in the single processor core if the compute device is to process the corresponding buffer queue in parallel in the single processor core, and wherein the means for serially processing, if the compute device is not to process the buffer queue in parallel in the single processor core, the one or more buffers in the buffer queue comprises means for serially processing, for each buffer queue of the plurality of buffer queues, the one or more buffers in the corresponding buffer queue instructions if the compute device is not to process the corresponding buffer queue in parallel in the single processor core.

Example 33 includes the subject matter of any of Examples 28-32, and wherein the means for serially processing the two or more buffers in the buffer queue in parallel in the single processor core comprises means for receiving, after a determination that the compute device is to process the buffer queue in parallel in the single processor core, a latency-sensitive buffer for processing; means for serially processing, prior to completing the processing of the two or more buffers, the latency-sensitive buffer.

Example 34 includes the subject matter of any of Examples 28-33, and wherein the means for processing the two or more buffers in the buffer queue in parallel in the single processor core comprises means for processing, by a primary thread of the compute device, a maximum number of buffers in parallel in the single processor core, wherein the maximum number of buffers is the highest number of buffers that can be contemporaneously processed by the single processor with the SIMD instructions; means for determining a number of remaining buffers in the buffer queue; means for determining, based on the number of remaining buffers, whether to process the remaining buffers in the buffer queue in parallel in the single processor core with the SIMD instructions; means for processing, by a secondary thread of the compute device and if the compute device is to process the remaining buffers in the buffer queue in parallel in the single processor core, the remaining buffers in the buffer queue in parallel in the single processor core; and means for serially processing, by the secondary thread of the compute device and if the compute device is not to process the remaining buffers in the buffer queue in parallel in the single processor core, the remaining buffers in the buffer queue.

Example 35 includes the subject matter of any of Examples 28-34, and wherein the means for processing the two or more buffers in the buffer queue in parallel in the single processor core comprises means for processing a portion of the two or more buffers; means for determining, in response to processing the portion of the two or more buffers, whether new buffers are in the buffer queue; means for processing, in response to a determination that the new buffers are in the buffer queue, the two or more buffers and the new buffers in parallel in the single processor core, wherein the means for processing the two or more buffers and the new buffers comprises means for continuing to process the two or more buffers beginning at the end of the processed portion of the two or more buffers.

Example 36 includes the subject matter of any of Examples 28-35, and wherein the means for serially processing the one or more buffers in the buffer queue comprises means for processing a portion of the one or more buffers; means for determining, in response to processing the portion of the one or more buffers, whether new buffers are in the buffer queue; means for determining, in response to a determination that the new buffers are in the buffer queue, whether to process the one or more buffers and the new buffers in parallel in the single processor core with SIMD instructions; means for processing, in response to a determination to process the one or more buffers and the new buffers in parallel in the single processor core, the one or more buffers and the new buffers in parallel in the single processor core, wherein the means for processing the one or more buffers and the new buffers comprises means for continuing to process the one or more buffers beginning at the end of the processed portion of the one or more buffers.

Example 37 includes the subject matter of any of Examples 28-36, and wherein the means for processing the two or more buffers in the buffer queue in parallel in the single processor core comprises means for performing a hash algorithm on each buffer of the two or more buffers.

Example 38 includes the subject matter of any of Examples 28-37, and wherein the hash algorithm is a Secure Hash Algorithm 2 (SHA-2) algorithm.

Example 39 includes the subject matter of any of Examples 28-38, and wherein the means for processing the two or more buffers in the buffer queue in parallel in the single processor core comprises means for performing an encryption algorithm on each buffer of the two or more buffers.

Example 40 includes the subject matter of any of Examples 28-39, and wherein the means for processing the two or more buffers in the buffer queue in parallel in the single processor core comprises means for performing a compression algorithm on each buffer of the two or more buffers.

The invention claimed is:

1. A compute device for adaptive processing of multiple buffers, the compute device comprising:
   a processor comprising one or more processor cores;
   a buffer queue manager to determine a number of buffers in a buffer queue and to determine an algorithm to be applied to the number of buffers in the buffer queue; and
   a buffer processor to:
      determine whether to process the buffer queue in parallel in a single processor core of the one or more processor cores with single instruction, multiple data (SIMD) instructions based on the number of buffers, a throughput per buffer of the algorithm when processed in parallel in the single processor core, and a throughput per buffer of the algorithm when serially processed in the single processor core;
      process, if the compute device is to process the buffer queue in parallel in the single processor core, two or more buffers in the buffer queue with the SIMD instructions; and
      serially process, if the compute device is not to process the buffer queue in parallel with the single processor core, one or more buffers in the buffer queue.

2. The compute device of claim 1, wherein the buffer processor is further to:
   determine a throughput per buffer of the algorithm when processed in parallel in the single processor core; and
   determine a throughput per buffer of the algorithm when serially processed in the single processor core.

3. The compute device of claim 2, wherein the throughput per buffer of the algorithm when processed in parallel in the single processor core is less than half of the throughput per buffer of the algorithm when serially processed in the single processor core and more one third of the throughput per buffer of the algorithm when serially processed in the single processor core,
   wherein to determine, based on the number of buffers, whether to process the buffer queue with the SIMD instructions comprises to:
   determine a total throughput of the algorithm when processed in parallel in the single processor core with the SIMD instructions by multiplication of the throughput per buffer of the algorithm when processed in parallel in the single processor core by the number of buffers;
   determine a total throughput of the algorithm when serially processed in the single processor core by multiplication of the throughput per buffer of the algorithm when serially processed in the single processor core by the number of buffers; and
   determine whether the total throughput of the algorithm when processed in parallel in the single processor core is higher than the total throughput of the algorithm when serially processed in the single processor core,
   wherein to process two or more buffers in the buffer queue in parallel in the single processor core comprises to:
   process, if the number of buffers is at least three, three or more buffers in parallel in the single processor core in response to a determination that the total throughput of the algorithm when processed in parallel in the single processor core is higher than the total throughput of the algorithm when serially processed in the single processor core, and
   wherein to process one or more buffers in the buffer queue with the SIMD instructions comprises to serially process, if the number of buffers is at most two, one or two buffers in response to a determination that the total throughput of the algorithm when processed in parallel in the single processor core is not higher than the total throughput of the algorithm when serially processed in the single processor core.

4. The compute device of claim 1, wherein the buffer queue manager is further to receive a buffer to be processed, and wherein the buffer processor is further to assign, based on a length of the buffer, the buffer to the buffer queue of a plurality of buffer queues, wherein each buffer queue of the plurality of buffer queues is associated with a different range of buffer lengths.

5. The compute device of claim 4, wherein to determine the number of buffers in the buffer queue comprises to determine, for each buffer queue of the plurality of buffer queues, a number of buffers in the corresponding buffer queue,
   wherein to determine, based on the number of buffers, whether to process the buffer queue in parallel in the single processor core with the SIMD instructions comprises to determine, for each buffer queue of the plurality of buffer queues and based on the corresponding number of buffers, whether to process the corresponding buffer queue in parallel in the single processor core with the SIMD instructions,
   wherein to process, if the compute device is to process the buffer queue in parallel in the single processor core, the two or more buffers in the buffer queue in parallel in the single processor core comprises to process, for each buffer queue of the plurality of buffer queues, the two or more buffers in the corresponding buffer queue in parallel in the single processor core if the compute device is to process the corresponding buffer queue in parallel in the single processor core, and
   wherein to serially process, if the compute device is not to process the buffer queue in parallel in the single processor core, the one or more buffers in the buffer queue comprises to serially process, for each buffer queue of the plurality of buffer queues, the one or more buffers in the corresponding buffer queue instructions if the compute device is not to process the corresponding buffer queue in parallel in the single processor core.

6. The compute device of claim 1, wherein to process the two or more buffers in the buffer queue in parallel in the single processor core comprises to:
   process, by a primary thread of the compute device, a maximum number of buffers in parallel in the single processor core, wherein the maximum number of buffers is the highest number of buffers that can be contemporaneously processed by the single processor with the SIMD instructions;
   determine a number of remaining buffers in the buffer queue;
   determine, based on the number of remaining buffers, whether to process the remaining buffers in the buffer queue in parallel in the single processor core with the SIMD instructions;
   process, by a secondary thread of the compute device and if the compute device is to process the remaining buffers in the buffer queue in parallel in the single processor core, the remaining buffers in the buffer queue in parallel in the single processor core; and serially process, by the secondary thread of the compute device and if the compute device is not to process the remaining buffers in the buffer queue in parallel in the single processor core, the remaining buffers in the buffer queue.

7. The compute device of claim 1, wherein to serially process the one or more buffers in the buffer queue comprises to:

process a portion of the one or more buffers;

determine, in response to a completion of processing the portion of the one or more buffers, whether new buffers are in the buffer queue;

determine, in response to a determination that the new buffers are in the buffer queue, whether to process the one or more buffers and the new buffers in parallel in the single processor core with SIMD instructions; and process, in response to a determination to process the one or more buffers and the new buffers in parallel in the single processor core, the one or more buffers and the new buffers in parallel in the single processor core, wherein to process the one or more buffers and the new buffers comprises to continue to process the one or more buffers beginning at the end of the processed portion of the one or more buffers.

8. The compute device of claim 1, wherein to process the two or more buffers in the buffer queue in parallel in the single processor core comprises to perform a hash algorithm on each buffer of the two or more buffers.

9. The compute device of claim 1, wherein to process the two or more buffers in the buffer queue in parallel in the single processor core comprises to perform an encryption algorithm on each buffer of the two or more buffers.

10. A method for adaptive processing of multiple buffers on a compute device, the method comprising:

determining, by the compute device, a number of buffers in a buffer queue and an algorithm to be applied to the number of buffers in the buffer queue;

determining, by the compute device, whether to process the buffer queue in parallel in a single processor core of the compute device with single instruction, multiple data (SIMD) instructions based on the number of buffers, a throughput per buffer of the algorithm when processed in parallel in the single processor core, and a throughput per buffer of the algorithm when serially processed in the single processor core;

processing, by the compute device and if the compute device is to process the buffer queue in parallel in the single processor core, two or more buffers in the buffer queue with the SIMD instructions; and serially processing, by the compute device and if the compute device is not to process the buffer queue in parallel with the single processor core, one or more buffers in the buffer queue.

11. The method of claim 10, further comprising:

determining, by the compute device, a throughput per buffer of the algorithm when processed in parallel in the single processor core; and determining, by the compute device, a throughput per buffer of the algorithm when serially processed in the single processor core.

12. The method of claim 11, wherein the throughput per buffer of the algorithm when processed in parallel in the single processor core is less than half of the throughput per buffer of the algorithm when serially processed in the single processor core and more one third of the throughput per buffer of the algorithm when serially processed in the single processor core, wherein determining, based on the number of buffers, whether to process the buffer queue with the SIMD instructions comprises:

determining a total throughput of the algorithm when processed in parallel in the single processor core with the SIMD instructions by multiplying the throughput per buffer of the algorithm when processed in parallel in the single processor core by the number of buffers;

determining a total throughput of the algorithm when serially processed in the single processor core by multiplying the throughput per buffer of the algorithm when serially processed in the single processor core by the number of buffers; and determining whether the total throughput of the algorithm when processed in parallel in the single processor core is higher than the total throughput of the algorithm when serially processed in the single processor core, wherein processing two or more buffers in the buffer queue in parallel in the single processor core comprises processing, if the number of buffers is at least three, three or more buffers in parallel in the single processor core in response to a determination that the total throughput of the algorithm when processed in parallel in the single processor core is higher than the total throughput of the algorithm when serially processed in the single processor core, and wherein processing one or more buffers in the buffer queue with the SIMD instructions comprises serially processing, if the number of buffers is at most two, one or two buffers in response to a determination that the total throughput of the algorithm when processed in parallel in the single processor core is not higher than the total throughput of the algorithm when serially processed in the single processor core.

13. The method of claim 10, further comprising:

receiving, by the compute device, a buffer for processing; and assigning, by the compute device and based on a length of the buffer, the buffer to the buffer queue of a plurality of buffer queues, wherein each buffer queue of the plurality of buffer queues is associated with a different range of buffer lengths.

14. The method of claim 13, wherein determining the number of buffers in the buffer queue comprises determining, for each buffer queue of the plurality of buffer queues, a number of buffers in the corresponding buffer queue, wherein determining, based on the number of buffers, whether to process the buffer queue in parallel in the single processor core with the SIMD instructions comprises determining, for each buffer queue of the plurality of buffer queues and based on the corresponding number of buffers, whether to process the corresponding buffer queue in parallel in the single processor core with the SIMD instructions, wherein processing, if the compute device is to process the buffer queue in parallel in the single processor core, the two or more buffers in the buffer queue in parallel in the single processor core comprises processing, for each buffer queue of the plurality of buffer queues, the two or more buffers in the corresponding buffer queue in parallel in the single processor core if the compute device is to process the corresponding buffer queue in parallel in the single processor core, and wherein serially processing, if the compute device is not to process the buffer queue in parallel in the single processor core, the one or more buffers in the buffer queue comprises serially processing, for each buffer queue of the plurality of buffer queues, the one or more buffers in the corresponding buffer queue instructions if the compute device is not to process the corresponding buffer queue in parallel in the single processor core.

15. The method of claim 10, wherein processing the two or more buffers in the buffer queue in parallel in the single processor core comprises:
processing, by a primary thread of the compute device, a maximum number of buffers in parallel in the single processor core, wherein the maximum number of buffers is the highest number of buffers that can be contemporaneously processed by the single processor with the SIMD instructions;
determining, by the compute device, a number of remaining buffers in the buffer queue;
determining, by the compute device and based on the number of remaining buffers, whether to process the remaining buffers in the buffer queue in parallel in the single processor core with the SIMD instructions;
processing, by a secondary thread of the compute device and if the compute device is to process the remaining buffers in the buffer queue in parallel in the single processor core, the remaining buffers in the buffer queue in parallel in the single processor core; and
serially processing, by the secondary thread of the compute device and if the compute device is not to process the remaining buffers in the buffer queue in parallel in the single processor core, the remaining buffers in the buffer queue.

16. The method of claim 10, wherein serially processing the one or more buffers in the buffer queue comprises:
processing a portion of the one or more buffers;
determining, in response to processing the portion of the one or more buffers, whether new buffers are in the buffer queue;
determining, in response to a determination that the new buffers are in the buffer queue, whether to process the one or more buffers and the new buffers in parallel in the single processor core with SIMD instructions; and
processing, in response to a determination to process the one or more buffers and the new buffers in parallel in the single processor core, the one or more buffers and the new buffers in parallel in the single processor core, wherein processing the one or more buffers and the new buffers comprises continuing to process the one or more buffers beginning at the end of the processed portion of the one or more buffers.

17. The method of claim 10, wherein processing the two or more buffers in the buffer queue in parallel in the single processor core comprises performing a hash algorithm on each buffer of the two or more buffers.

18. One or more non-transitory computer-readable media comprising a plurality of instructions stored thereon that, when executed, causes a compute device to:
determine a number of buffers in a buffer queue;
determine an algorithm to be applied to the number of buffers in the buffer queue;
determine whether to process the buffer queue in parallel in a single processor core of one or more processor cores of the compute device with single instruction, multiple data (SIMD) instructions based on the number of buffers, a throughput per buffer of the algorithm when processed in parallel in the single processor core, and a throughput per buffer of the algorithm when serially processed in the single processor core;
process, if the compute device is to process the buffer queue in parallel in the single processor core, two or more buffers in the buffer queue with the SIMD instructions; and
serially process, if the compute device is not to process the buffer queue in parallel with the single processor core, one or more buffers in the buffer queue.

19. The one or more computer-readable media of claim 18, wherein the plurality of instructions further causes the compute device to:
determine a throughput per buffer of the algorithm when processed in parallel in the single processor core; and
determine a throughput per buffer of the algorithm when serially processed in the single processor core.

20. The one or more computer-readable media of claim 19, wherein the throughput per buffer of the algorithm when processed in parallel in the single processor core is less than half of the throughput per buffer of the algorithm when serially processed in the single processor core and more one third of the throughput per buffer of the algorithm when serially processed in the single processor core,
wherein to determine, based on the number of buffers, whether to process the buffer queue with the SIMD instructions comprises to:
determine a total throughput of the algorithm when processed in parallel in the single processor core with the SIMD instructions by multiplication of the throughput per buffer of the algorithm when processed in parallel in the single processor core by the number of buffers;
determine a total throughput of the algorithm when serially processed in the single processor core by multiplication of the throughput per buffer of the algorithm when serially processed in the single processor core by the number of buffers; and
determine whether the total throughput of the algorithm when processed in parallel in the single processor core is higher than the total throughput of the algorithm when serially processed in the single processor core,
wherein to process two or more buffers in the buffer queue in parallel in the single processor core comprises to process, if the number of buffers is at least three, three or more buffers in parallel in the single processor core in response to a determination that the total throughput of the algorithm when processed in parallel in the single processor core is higher than the total throughput of the algorithm when serially processed in the single processor core, and
wherein to process one or more buffers in the buffer queue with the SIMD instructions comprises to serially process, if the number of buffers is at most two, one or two buffers in response to a determination that the total throughput of the algorithm when processed in parallel in the single processor core is not higher than the total throughput of the algorithm when serially processed in the single processor core.

21. The one or more computer-readable media of claim 18, wherein the plurality of instructions further causes the compute device to:
receive a buffer to be processed; and
assign, based on a length of the buffer, the buffer to the buffer queue of a plurality of buffer queues,
wherein each buffer queue of the plurality of buffer queues is associated with a different range of buffer lengths.

22. The one or more computer-readable media of claim 21, wherein to determine the number of buffers in the buffer queue comprises to determine, for each buffer queue of the plurality of buffer queues, a number of buffers in the corresponding buffer queue,
- wherein to determine, based on the number of buffers, whether to process the buffer queue in parallel in the single processor core with the SIMD instructions comprises to determine, for each buffer queue of the plurality of buffer queues and based on the corresponding number of buffers, whether to process the corresponding buffer queue in parallel in the single processor core with the SIMD instructions,
- wherein to process, if the compute device is to process the buffer queue in parallel in the single processor core, the two or more buffers in the buffer queue in parallel in the single processor core comprises to process, for each buffer queue of the plurality of buffer queues, the two or more buffers in the corresponding buffer queue in parallel in the single processor core if the compute device is to process the corresponding buffer queue in parallel in the single processor core, and
- wherein to serially process, if the compute device is not to process the buffer queue in parallel in the single processor core, the one or more buffers in the buffer queue comprises to serially process, for each buffer queue of the plurality of buffer queues, the one or more buffers in the corresponding buffer queue instructions if the compute device is not to process the corresponding buffer queue in parallel in the single processor core.

23. The one or more computer-readable media of claim 18, wherein to process the two or more buffers in the buffer queue in parallel in the single processor core comprises to:
- process, by a primary thread of the compute device, a maximum number of buffers in parallel in the single processor core, wherein the maximum number of buffers is the highest number of buffers that can be contemporaneously processed by the single processor with the SIMD instructions;
- determine a number of remaining buffers in the buffer queue;
- determine, based on the number of remaining buffers, whether to process the remaining buffers in the buffer queue in parallel in the single processor core with the SIMD instructions;
- process, by a secondary thread of the compute device and if the compute device is to process the remaining buffers in the buffer queue in parallel in the single processor core, the remaining buffers in the buffer queue in parallel in the single processor core; and
- serially process, by the secondary thread of the compute device and if the compute device is not to process the remaining buffers in the buffer queue in parallel in the single processor core, the remaining buffers in the buffer queue.

24. The one or more computer-readable media of claim 18, wherein to serially process the one or more buffers in the buffer queue comprises to:
- process a portion of the one or more buffers;
- determine, in response to a completion of processing the portion of the one or more buffers, whether new buffers are in the buffer queue;
- determine, in response to a determination that the new buffers are in the buffer queue, whether to process the one or more buffers and the new buffers in parallel in the single processor core with SIMD instructions; and
- process, in response to a determination to process the one or more buffers and the new buffers in parallel in the single processor core, the one or more buffers and the new buffers in parallel in the single processor core, wherein to process the one or more buffers and the new buffers comprises to continue to process the one or more buffers beginning at the end of the processed portion of the one or more buffers.

25. The one or more computer-readable media of claim 18, wherein to process the two or more buffers in the buffer queue in parallel in the single processor core comprises to perform a hash algorithm on each buffer of the two or more buffers.

* * * * *